United States Patent
Yamada et al.

(10) Patent No.: US 7,567,850 B2
(45) Date of Patent: Jul. 28, 2009

(54) METHOD AND SYSTEM FOR CREATING A PRODUCT PARTS CATALOG

(75) Inventors: Tomohiro Yamada, Tokyo (JP); Koji Tanaka, Tokyo (JP); Tsuyoshi Harada, Tokyo (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 10/530,219

(22) PCT Filed: Jun. 3, 2004

(86) PCT No.: PCT/JP2004/007718

§ 371 (c)(1),
(2), (4) Date: Mar. 31, 2005

(87) PCT Pub. No.: WO2004/109561

PCT Pub. Date: Dec. 16, 2004

(65) Prior Publication Data

US 2006/0053071 A1    Mar. 9, 2006

(30) Foreign Application Priority Data

Jun. 3, 2003    (JP) ............................. 2003-158541

(51) Int. Cl.
*G06F 19/00* (2006.01)
*G06F 3/00* (2006.01)
*G09G 5/10* (2006.01)

(52) U.S. Cl. .................. 700/98; 700/182; 715/709; 715/964; 703/6; 345/642; 345/646; 345/650; 345/652; 345/653

(58) Field of Classification Search ................ 700/97, 700/98, 102, 107, 178, 180, 182, 185; 715/709, 715/907, 961, 964, 970; 345/419, 420, 619, 345/646–650, 652, 653, 655, 656, 473, 474, 345/642; 703/1, 6, 7

See application file for complete search history.

(56) References Cited

U.S. PATENT DOCUMENTS 5,619,630 A * 4/1997 Minami et al. .............. 345/619

(Continued)

FOREIGN PATENT DOCUMENTS

EP    1152362 A1 *    11/2001

(Continued)

OTHER PUBLICATIONS

Katsuma, A. et al., "Automatic Arrangement of Meta-Objects in Assembly Illustrations", *Conference for Electrical Information Communication Studies*, Mar. 1995, 314.

(Continued)

*Primary Examiner*—Sean P Shechtman
(74) *Attorney, Agent, or Firm*—Woodcock Washburn LLP

(57) ABSTRACT

A method and a system are disclosed for enabling an automatic creation of a parts list and 3-dimensional illustrations of a product based on 3-dimensional CAD or XVL data of an industrial product consisting of a plurality of parts. A method for generating a parts catalog consisting of a parts list and corresponding disassembly illustrations is provided. This method comprises the steps of (a) assigning reference numerals/symbols based on the parts list; (b) building a disassembly algorithm based on the parts list; and (c) generating disassembly illustrations based on the disassembly algorithm, wherein minimum disassembly units of the disassembly illustrations are parts and parts groups assigned with the reference numerals/symbols, and displaying the reference numeral/symbol for each of the parts and parts groups in the disassembly illustrations.

11 Claims, 31 Drawing Sheets

U.S. PATENT DOCUMENTS

| | | | |
|---|---|---|---|
| 7,075,531 B1 * | 7/2006 | Ando et al. | 345/420 |
| 2001/0056488 A1 * | 12/2001 | Maeda et al. | 709/225 |

FOREIGN PATENT DOCUMENTS

| | | |
|---|---|---|
| EP | 1288868 A2 * | 3/2003 |
| JP | 07-239866 | 9/1995 |
| JP | 2001-255926 | 9/2001 |
| JP | 2001-312524 | 11/2001 |
| JP | 2002-056406 | 2/2002 |
| JP | 2002-140371 | 5/2002 |
| JP | 2003-006245 | 1/2003 |
| JP | 2003-076724 | 3/2003 |

OTHER PUBLICATIONS

Mohammad, R. et al., "Automatic Generation of Exploded Views by Graph Transformation", *Artificial Intellingence for Applications, Proceedings, Ninth Conference*, 1993, 368-374.

Qian, W-H. et al., "On the Scenario and Heuristics of Disassemblies", *IEEE International Confenence*, 1994, 264-271.

* cited by examiner

Parts List

| KEY | GP(PART) | GR(DESIGNATION) | LEVEL |
|---|---|---|---|
| 100 | Base | Tray, Feeder | 1 |
| 200 | Top Cover | Cover, Button | 2 |
| 300 | Panel | Panel | 2 |

| Process | Operation |
|---|---|
| Process-1 | Step 1 |
| | Step 2 |
| | Step 3 |

| Process | | Operation |
|---|---|---|
| Process-1 | Process-2 | Step 1 |
| | Process-3 | Step 2 |
| | Process-4 | Step 3 |
FIG. 7D
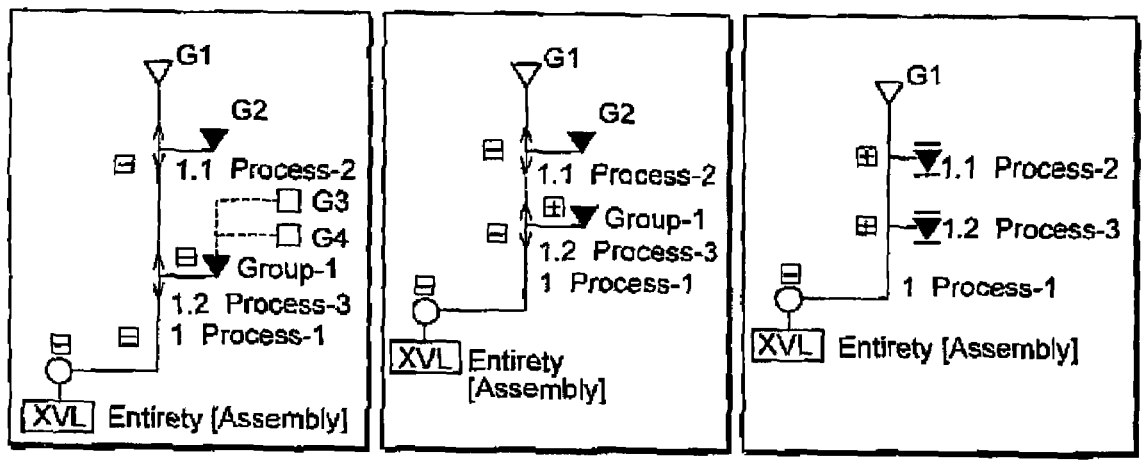
FIG. 8A    FIG. 8B    FIG. 8C
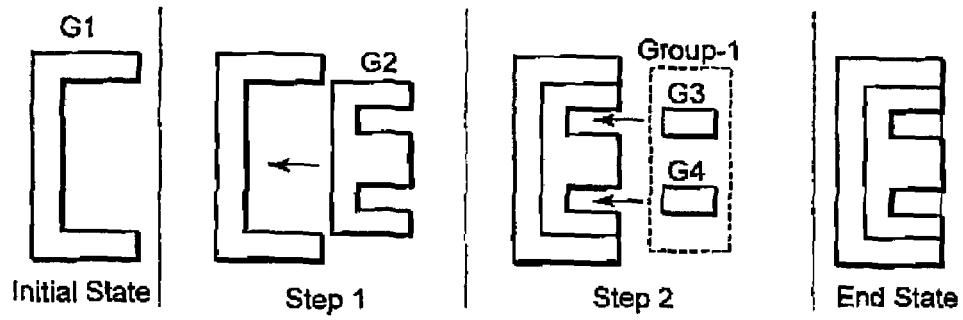
FIG. 8D
| Process | | Operation |
|---|---|---|
| Process-1 | Process-2 | Step 1 |
| | Process-3 | Step 2 |
FIG. 8E Parts List
| KEY | GP(PART) | GR(DESIGNATION) | LEVEL |
|---|---|---|---|
| 1 | G1 | G1 | 1 |
| 2 | G2 | G2 | 2 |
| 3 | Gp1 | G3, G4 | 2 |
FIG. 8F
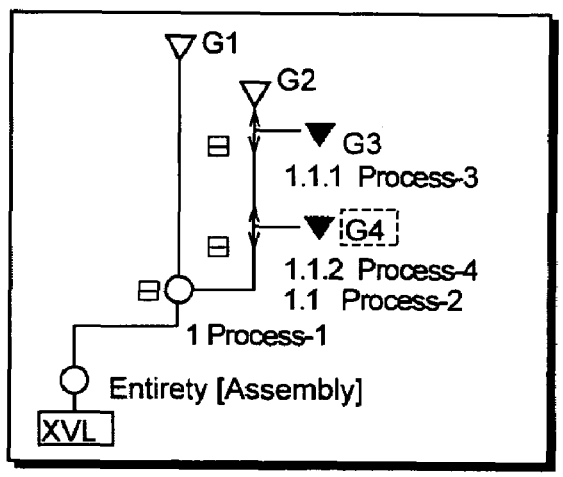
FIG. 9A
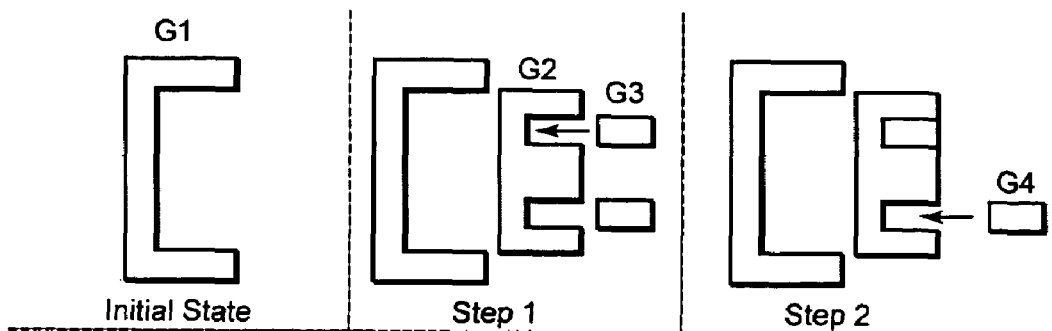
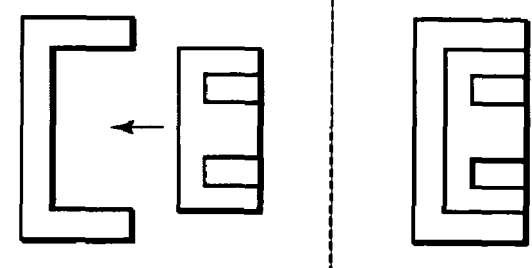
FIG. 9B

| Process | | | Operation |
|---|---|---|---|
| Process-1 | Process-2 | Process-3 | Step 1 |
| | | Process-4 | Step 2 |
| | Process-2 | | Step 3 |
FIG. 9C
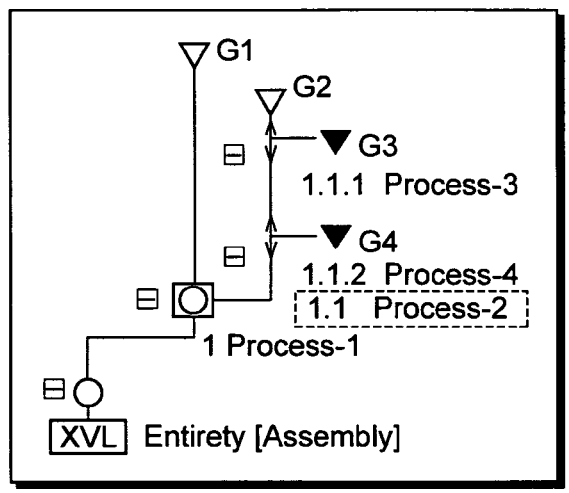
FIG. 10A
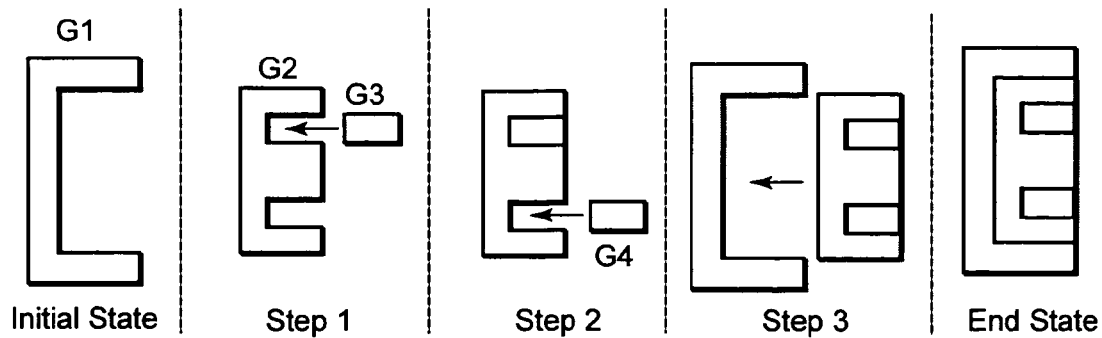
FIG. 10B Interference Occurring Here

METHOD AND SYSTEM FOR CREATING A PRODUCT PARTS CATALOG

CROSS REFERENCE TO RELATED APPLICATIONS

This application claims priority under 35 U.S.C. 119 based upon Japanese Patent Application Serial No. 2003-158541, filed on Jun. 3, 2003. The entire disclosure of the aforesaid applications is incorporated herein by reference.

FIELD OF THE INVENTION

This invention relates to a method and a system for creating a product parts catalog based on 3-dimensional CAD data or XVL data of, for example, industrial products consisting of a plurality of parts.

BACKGROUND OF THE INVENTION

In the manufacturing industry, disassembly/assembly procedures for product assembly or repair need to be indicated to the operators in an easy-to-understand manner. In general, such disassembly/assembly procedures as well as the parts catalog have been indicated using 3-dimensional illustrations showing the positional relationship and assembly orientation for the parts.

Such parts catalogs and illustrations have been created using methods such as the following:

(1) A parts list is first created and then an engineer, tracer or the like creates illustrations showing each disassembled part (block) according to the list.

(2) Disassembly illustrations are first created using CAD and then the created illustrations are manually numbered to create the parts list.

However, there are many manual tasks in either (1) and (2), making these methods onerous. It is also burdensome to check for consistency (especially the numbers) among the parts list and the illustrations. As a result, the creation of the parts list and the illustrations generally requires prodigious time and cost.

Considering the above situation, the purpose of the present invention is to provide a method and a system for enabling an automatic creation of the parts list and the 3-dimensional illustrations of a product based on 3-dimensional CAD or XVL data of, for example, an industrial product consisting of a plurality of parts.

SUMMARY OF THE INVENTION

In order to attain the above object, according to a principal aspect of the present invention, there is provided a method for generating a parts catalog consisting of a parts list and corresponding disassembly illustrations. This method comprises the steps of (a) assigning a reference numeral/symbol based on the parts list, to each of parts groups belonging to an initial process of disassembly, and to each of parts groups belonging to an intermediate process of disassembly, respectively; (b) building a disassembly algorithm based on the parts list; and (c) generating disassembly illustrations based on the disassembly algorithm, wherein minimum disassembly units of the disassembly illustrations are parts and parts groups assigned with the reference numeral/symbols, and displaying the reference numeral/symbol for each of the parts and parts groups in the disassembly illustrations.

According to one embodiment of this invention, each of the parts groups is an assembly consisting of one or more parts.

According to another embodiment, the parts list includes definition information of dependency relationships among parts and group relationships among groups, and comprises a tree structure consisting of nodes and leaves, which are processes and parts, respectively, wherein each of the nodes comprises a basic process and an intermediate process performed in the basic process, and wherein each of the leaves consists of a process parts group for grouping a plurality of parts or parts groups, and the parts or parts groups.

In addition, step (b) generates the disassembly algorithm by adding to the parts list, a moving coordinate system of the basic process and the intermediate process, and a respective moving position of the parts or parts groups and the process parts group along the moving coordinate system, that are determined based on the parts list. In this case, in the step (b), as for the moving coordinate system the coordinate system of a part or parts group that forms the base of the basic process is selected as the coordinate system of the basic process or the intermediate process. In addition, in step (b), a shape of each of the parts or parts groups is approximated with a circumscribing polygon thereof, and the moving position is set such that the each polygon is at a minimum distance from each other which is greater than a predetermined ratio.

Additionally according to yet another embodiment, step (b) preferably adds a camera view point information to generate the disassembly illustrations.

In addition, according to yet another embodiment, step of (d) modifying the disassembly algorithm and illustrations after generating the disassembly illustrations is included. In this case, the step (d) modifies each of the disassembly illustrations by modifying a position, a bearing or a scale of each of the parts or parts groups for each of the basic process, the intermediate processes and connecting processes connecting the basic and intermediate processes, wherein the basic, intermediate and connecting processes constitute the disassembly definition information. Also step (d) generates and presents a user interface for modifying the position, bearing or scale for each of the parts or parts groups.

Moreover, according to yet another embodiment, the step (d) permits modification of a camera view point information to modify the disassembly illustration.

Furthermore, according to yet another embodiment, step (d) modifies the disassembly illustration by determining an interference among the parts or parts groups during the movements thereof for each of the basic, intermediate and the connecting processes, wherein the basic, intermediate and connecting processes constitute the disassembly definition information, and by modifying the position, bearing or scale for each of the parts or parts groups in the processes. In this case, the interference among the parts or parts groups during the movements thereof is determined by calculating the interference among respective polygons circumscribed around each of the parts or parts groups.

Other characteristics and marked effects of the present invention will become apparent to those skilled in the art upon referring to explanations of the following specification when taken in conjunction with the accompanying drawings.

BRIEF DESCRIPTION OF THE DRAWINGS

FIGS. 7A-7D are diagrams showing the example of the disassembly definition information generation;

FIGS. 8A-8F are diagrams showing the example of the disassembly definition information generation;

FIGS. 9A-9C are diagrams showing the example of the disassembly definition information generation;

FIGS. 10A and 10B are diagrams showing the example of the disassembly definition information generation;

DETAILED DESCRIPTION OF THE PREFERRED EMBODIMENTS

Embodiments of the present invention applied to a printer will be described below with reference to the accompanying drawings.

Figures 1, 2:
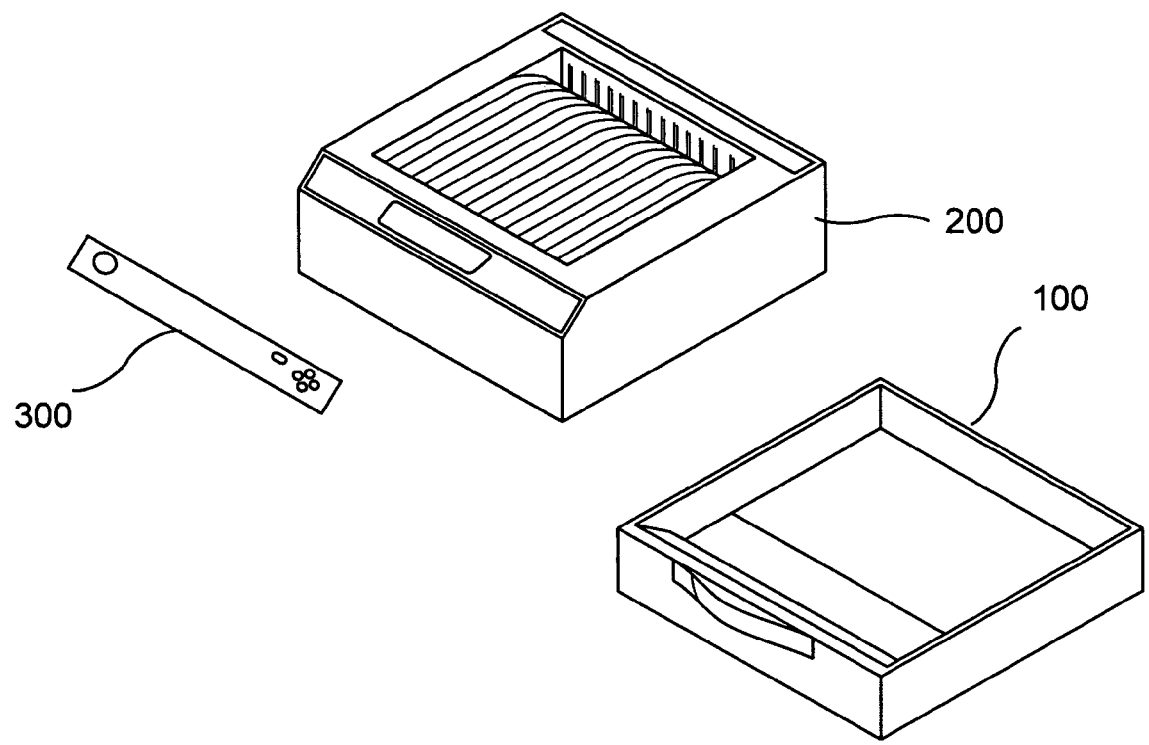
FIG. 1 is a diagram showing a disassembly illustration created by one embodiment of the present invention.
FIG. 2 is a diagram showing one example of a parts list.
Figure 3:
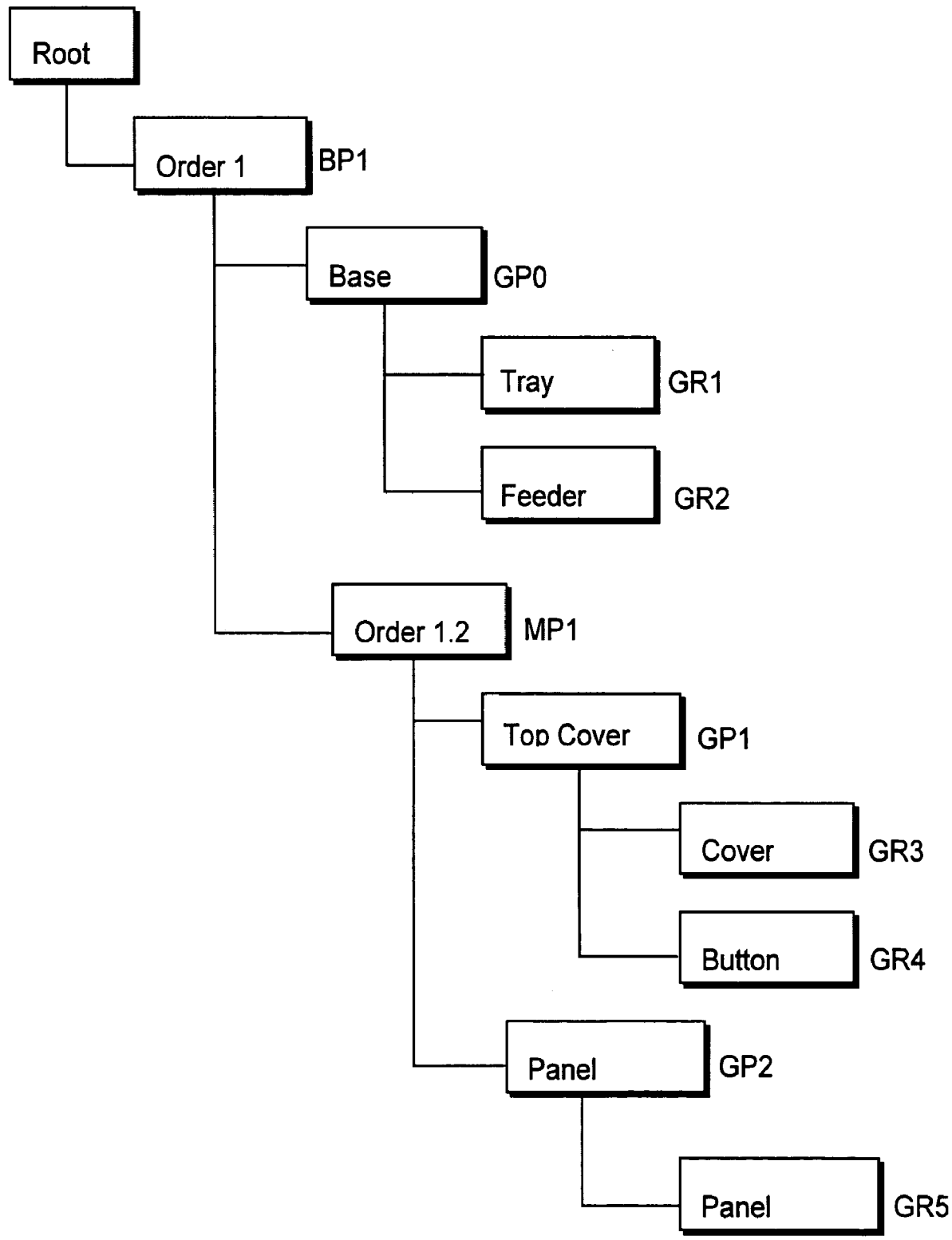
FIG. 3 is a conceptual diagram showing a disassembly algorithm generated from the parts list.

First, a concept of an embodiment according to this invention will be briefly described with respect to FIGS. 1-3.

FIG. 1 is a exploded perspective view of a printer consisting of 3 blocks (parts groups each composed of one or more parts). In this example, each of a base 100, a top cover 200 and a panel 300 are configured to be a disassembled unit (block).

FIG. 2 is a diagram showing one example of a parts list for generating the illustration of FIG. 1. Each block (GP) is defined with one or more components (GR) and disassembly levels (LEVEL).

FIG. 3 is a schematic diagram showing a disassembly algorithm generated from the parts list by a computer system according to this embodiment. "BP(1)" and "MP(1)" in this figure correspond to LEVEL 1 and LEVEL 2 in FIG. 2, respectively.

Furthermore, this computer system generates a disassembly illustration shown in FIG. 1 from 3-dimensional graphic data and this disassembly algorithm. Thus according to the system of this embodiment, the users can generate a illustration of disassembled blocks simply by creating a parts list. In this embodiment, numbers are automatically assigned to each of the blocks in the order they appear in the parts list. In this manner, it is unnecessary to check for consistency between the parts list number and a reference numeral/symbol in the disassembly illustration.

Structures and operations of the embodiments of the present invention will be described in detail below.

Figure 4:
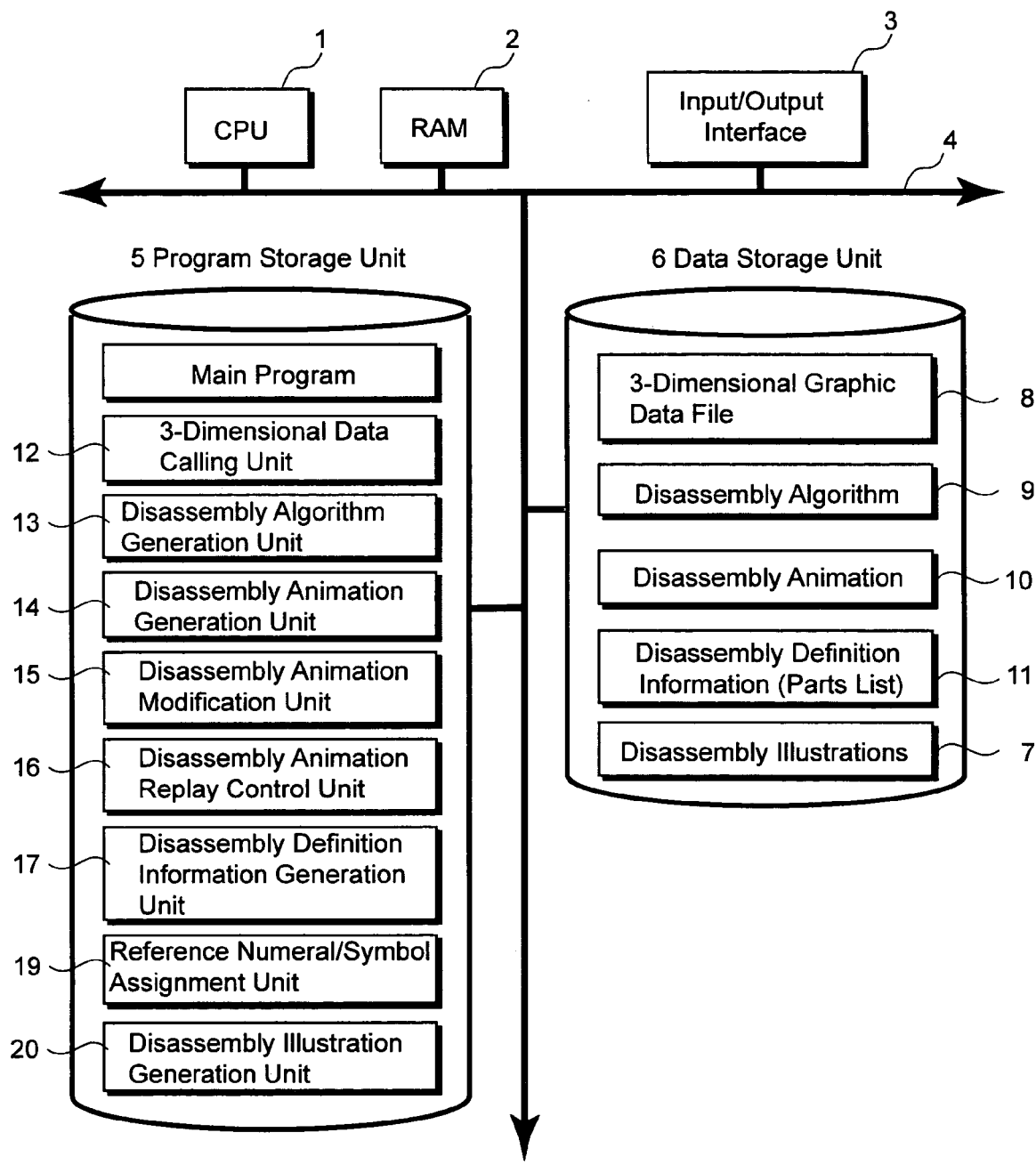
FIG. 4 is a schematic structural view of a system according to one embodiment of the invention.

FIG. 4 is a schematic structural view showing a system according to this one embodiment. Connected with a CPU 1, a RAM (memory) 2, an input and output interface 3 and the like, a bus 4 is also connected with a program storage unit 5 and a data storage unit 6.

Stored in the data storage unit 6 is a 3-dimensional graphic data file 8 in XVL format for providing 3-dimensional data used as materials for creating a disassembly/assembly animation. Additionally stored in this data storage unit 6 are disassembly definition information 11 (parts list), a disassembly algorithm 9, a disassembly animation 10 and the disassembly illustration 7.

Meanwhile, components stored in the program storage unit 5 and relevant to the present invention are: a 3-dimensional data calling unit 12 for obtaining and storing in the memory the 3-dimensional graphic data file 8 from the data storage unit 6; a disassembly definition information generation unit 17 for generating and storing in the memory the disassembly definition information 11 (parts list) for disassembling a product into parts based on user entries; a disassembly algorithm generation unit 13 for generating and storing in the memory the disassembly algorithm 9 of the product into parts according to the disassembly definition information 11; a disassembly animation generation unit 14 for generating and outputting the disassembly animation 10 of the product parts according to the disassembly algorithm 9; a disassembly animation modification unit 15 for modifying the disassembly algorithm 9 and instructing the disassembly animation generation unit 14 to re-generate the disassembly animation 10 after the animation is generated; a disassembly animation replay control unit 16 for controlling to replay the disassembly animation; a reference numeral/symbol assignment unit 19 for assigning a reference numeral/symbol to each parts group of the disassembly definition information; and a disassembly illustration generation unit 20 for generating a disassembly illustration assigned with the reference numeral/symbol according to the disassembly algorithm 9.

Here, information received from the user in the disassembly definition information generation unit 17 is definition information of dependency relationships among parts and group relationships among groups. Also, the disassembly definition information 11 (parts list) generated in this disassembly definition information generation unit 17 comprises a tree structure consisting of "nodes" and "leaves", which are processes and parts, respectively, as discussed in more detail below. In addition, each of these nodes comprises a "basic process" and an "intermediate process" performed in the basic process, and each of the leaves consists of a "process parts group" for grouping a plurality of parts or parts groups, and each of the parts or parts groups.

A concept of this disassembly definition information generation will be described below in accordance with FIG. 5 and later.

Figure 5A:
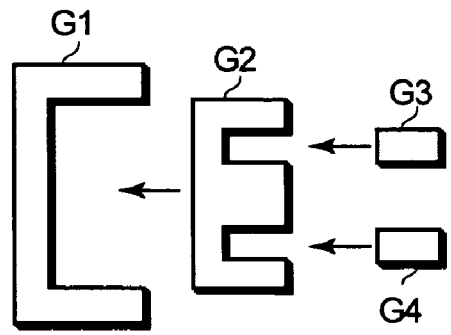
FIGS. 5A and 5B are diagrams showing the concept of disassembly definition information generation.
Figure 5B:
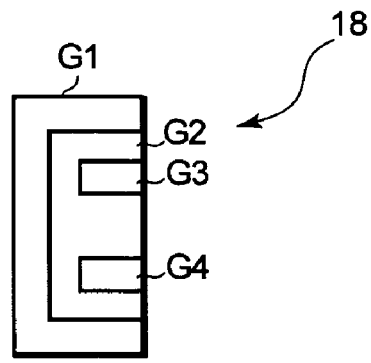
Figure 18:
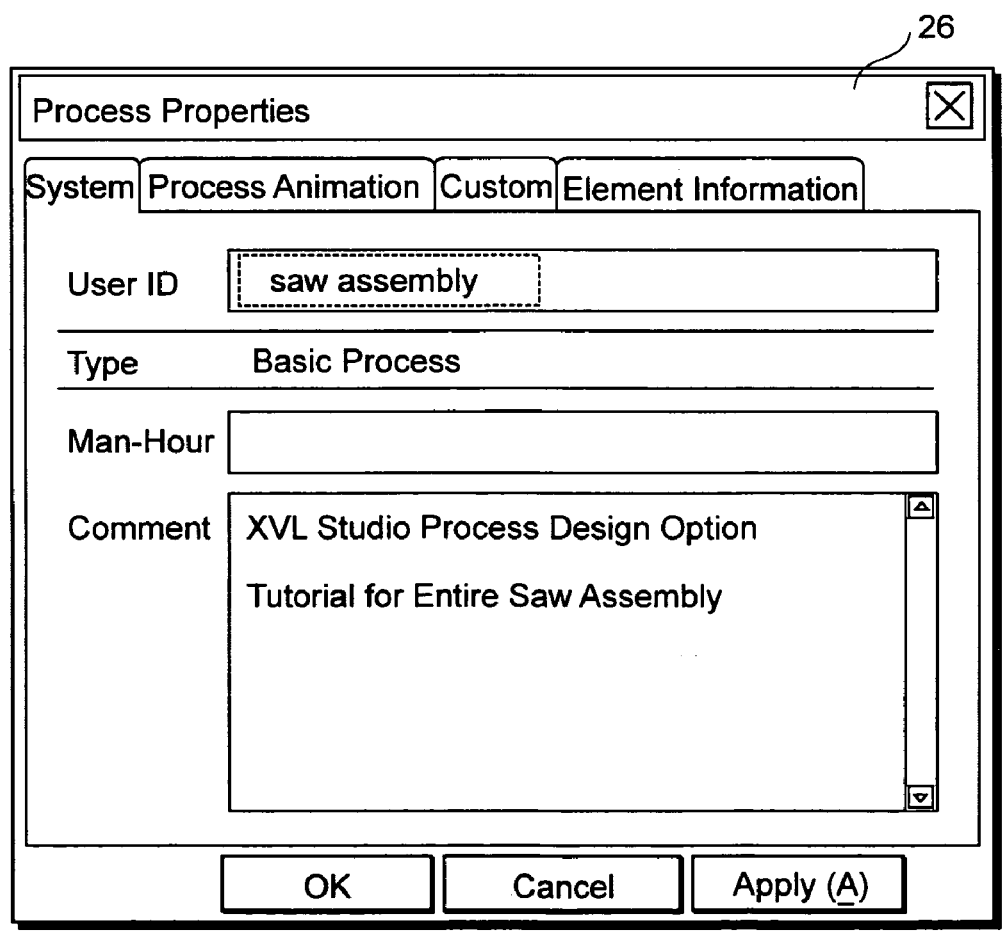
FIG. 18 is a diagram showing the creation of the process structure (disassembly definition information) using process properties.

For the simplicity, an example will be described wherein parts G1-G4 (in this embodiment referred to as a "group"), as shown in FIG. 5A, will be assembled to manufacture a finished product 18 shown in FIG. 5B. An assembly process design for these parts G1-G4 is performed through a predetermined interface (a design screen as shown in FIG. 18 and later) as described below.

FIGS. 6-13 shows different assembly orders, respectively, and indicates how to define and design the assembly process in each case.

Figure 6A:
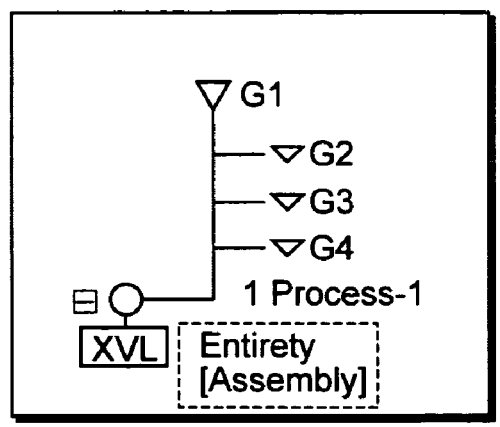
FIGS. 6A-6C are diagrams showing one example of the disassembly definition information generation.

FIG. 6 is an example in which the parts G2-G4 are sequentially assembled to the part GI in the order of G2-G4. In this case, the assembly process is shown as in FIG. 6A.

In this FIG., an icon "○" represents a basic process. Also a group (G1) registered at the top of this basic process is indicated with an icon "∇+vertical line under" to indicate a group (base group) as a basis of assembly (disassembly) of other components. This base group does not move in an animation.

Each of groups to be assembled/disassembled (G2-G4) other than the base group is indicated with an icon "—+∇". In the present example, a disassembly process consists of the basic process (Process-1) and the groups and does not include the intermediate process. That is, G1 is a base and G2-G4 are assembled groups.

Figures 6B, 6C:
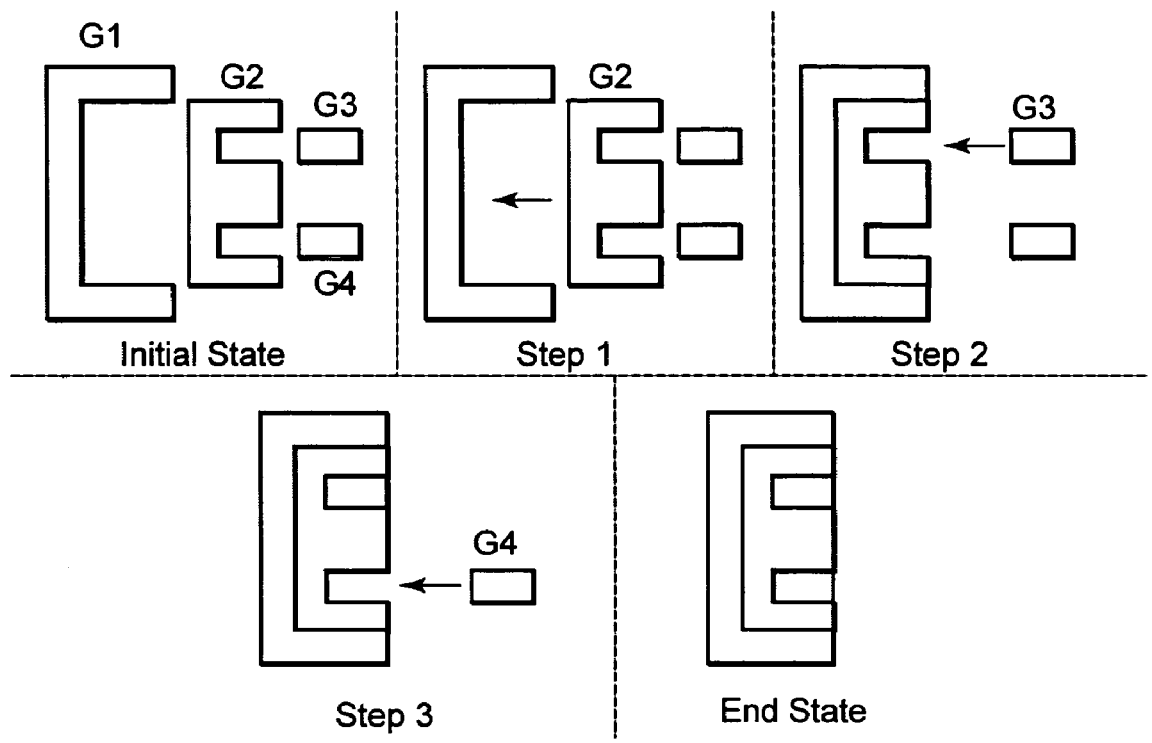

By creating a process animation from the above process structure during a process animation creation described below, an animation moving as in FIG. 6B is generated. In this case, all of the groups G1-G4 are displayed from the beginning and assembled sequentially.

In this case, a respective relationship between each operation step and each process is shown in FIG. 6C.

Figure 7A:
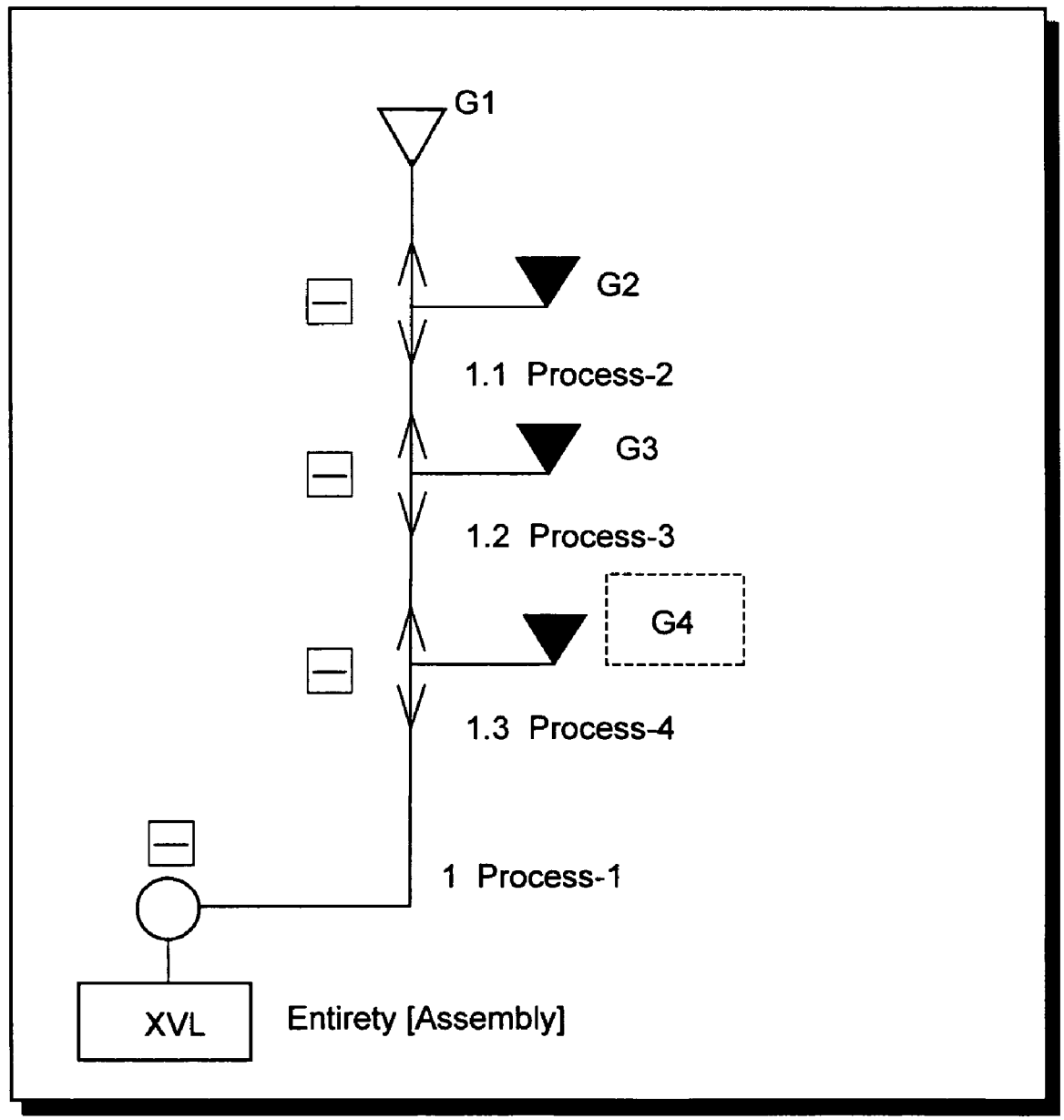
Figure 7B:
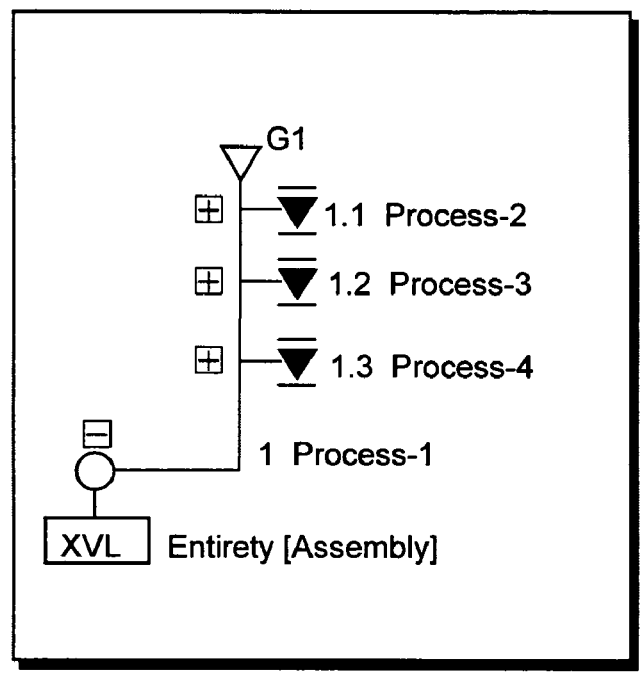

FIGS. 7A-7D are showing an example with intermediate processes as well as a basic process. Intermediate processes are used to further divide a basic process into a plurality of processes for, for example, groups to be assembled or dissembled within the basic group. Each group belonging to an intermediate process is indicated with "▼" as shown in FIG. 7A. As shown in FIG. 7B, each intermediate process is indicated with "▼+upper and under lines" when it is closed. Differences between a case with these intermediate processes and a case with only the basic process will be described below:

By using these intermediate processes, an assembly and/or a disassembly of a plurality of components may be grouped to set process information such as comments, man-hours and custom properties. Also a display timing can be differentiated in the process animation. When replaying an animation of this assembly process, said disassembly animation replay control unit 16 displays elements of the intermediate processes not initially, but after the intermediate processes are displayed. In a disassembly process, however, it displays elements from an initial state but hides them when finished with replaying the intermediate processes.

FIGS. 7A and 7B show an example of process structuring using the intermediate processes. In the FIG. 7A, the intermediate processes are open so that process components can be viewed. In this state, in order to indicate intermediate process components, "↕" is displayed. In FIG. 7B, each intermediate process is closed as described above and displayed with "▼+ upper and under lines".

Figure 7C:
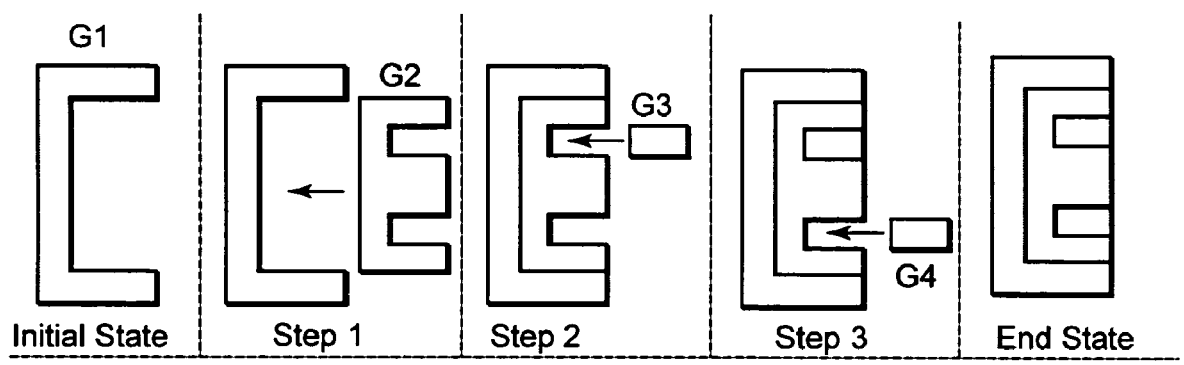

In the present example, the basic process Process-1 is divided into 3 intermediate processes, Process-2, Process-3 and Process-4. The difference between the animations of this example and the one in FIG. 6 is that in this example, each of the groups (parts) G2-G4 does not appear until the stage in which it is assembled as shown in FIG. 7C.

In the current example, a respective relationship between each process and each operation step is shown in FIG. 7D.

The significance of the process parts group will be described below in reference to FIG. 8.

FIGS. 8A-8F show an example in which a process is structured using process parts groups so that G3 and G4 are simultaneously assembled. Although the 3 process drawings all represent the same process, process parts group components are closed to be undisplayed in FIG. 8B, and each intermediate process is closed in FIG. 8C.

A process parts group is one assembly (disassembly) unit which groups a plurality of groups and is indicated using "▼", as shown in FIG. 8B, as an alternative to a group. Each group included in the process parts group is indicated with "□" as shown in FIG. 8A. By using the process parts group, an animation in which a plurality of groups simultaneously move may be created with the process animation creation described below.

In this case, an animation as in FIG. 8D is created during the process animation creation. A respective relationship between each process and each operation step is shown in FIG. 8E.

FIGS. 9 and 10 show an example which allows assembling (disassembling) of an assembly (disassembly) animation with a plurality of parts for each of the parts by creating a structure that includes basic processes as components of another basic process (nesting of basic processes).

This is used to represent assembly (disassembly) procedures when, for example, assembling small parts and then fitting the assembled small parts into a larger part. Additionally the larger part may be set to be not displayed when an animation for the small part assembly is being replayed. FIGS. 9 and 10 will be used below to describe cases with and without the larger part displayed, respectively.

FIG. 9A is an example in which the processes are structured using the nested basic processes so that G2, G3 and G4 are assembled into a medium part and then assembled into a large part G1. In this animation, the large part (G1) is displayed even during the assembly of the small parts (G2, G3 and G4).

In this case, an animation as in FIG. 9B is created during the process animation creation. A respective relationship between each process and each operation step is shown in FIG. 9C.

FIG. 10A shows an example in which G1 is set to be not displayed during the assembly of G2, G3 and G4. When compared with FIG. 9A, the G2-based process "Process-2" is indicated with an icon in which ○ is superimposed on □. In this case, the large part (G1) is not displayed during the assembly of the small parts (G2, G3 and G4) in the process animation. A respective relationship between each process and each operation step is the same as the previous case (FIG. 9C).

As described above, when the user specifies parts (group), basic processes, intermediate processes and process parts groups through a prepared interface, the disassembly definition information generation unit 17 generates the disassembly definition information 11 (parts list) accordingly and stores the information in the data storage unit 6.

Alternatively the parts list, as shown in FIG. 2, may also be directly entered as disassembly definition information without such an interface. This parts list should be created such that parts or parts groups belonging to the base process (▽) are assigned to the level 1, and parts or parts groups belonging to one or more dependent intermediate processes (▼) are assigned to a level 2 or later. For FIG. 8 for example, the parts list becomes as in FIG. 8F.

Thus after the disassembly definition information or parts list is prepared, the reference numeral/symbol assignment unit 19 assigns reference numeral/symbols to parts or parts groups constituting the intermediate process, respectively. In the example of FIG. 8F, reference numeral/symbols 1, 2, 3, . . . are assigned to G1, G2 and Gp1, respectively.

Figure 11:
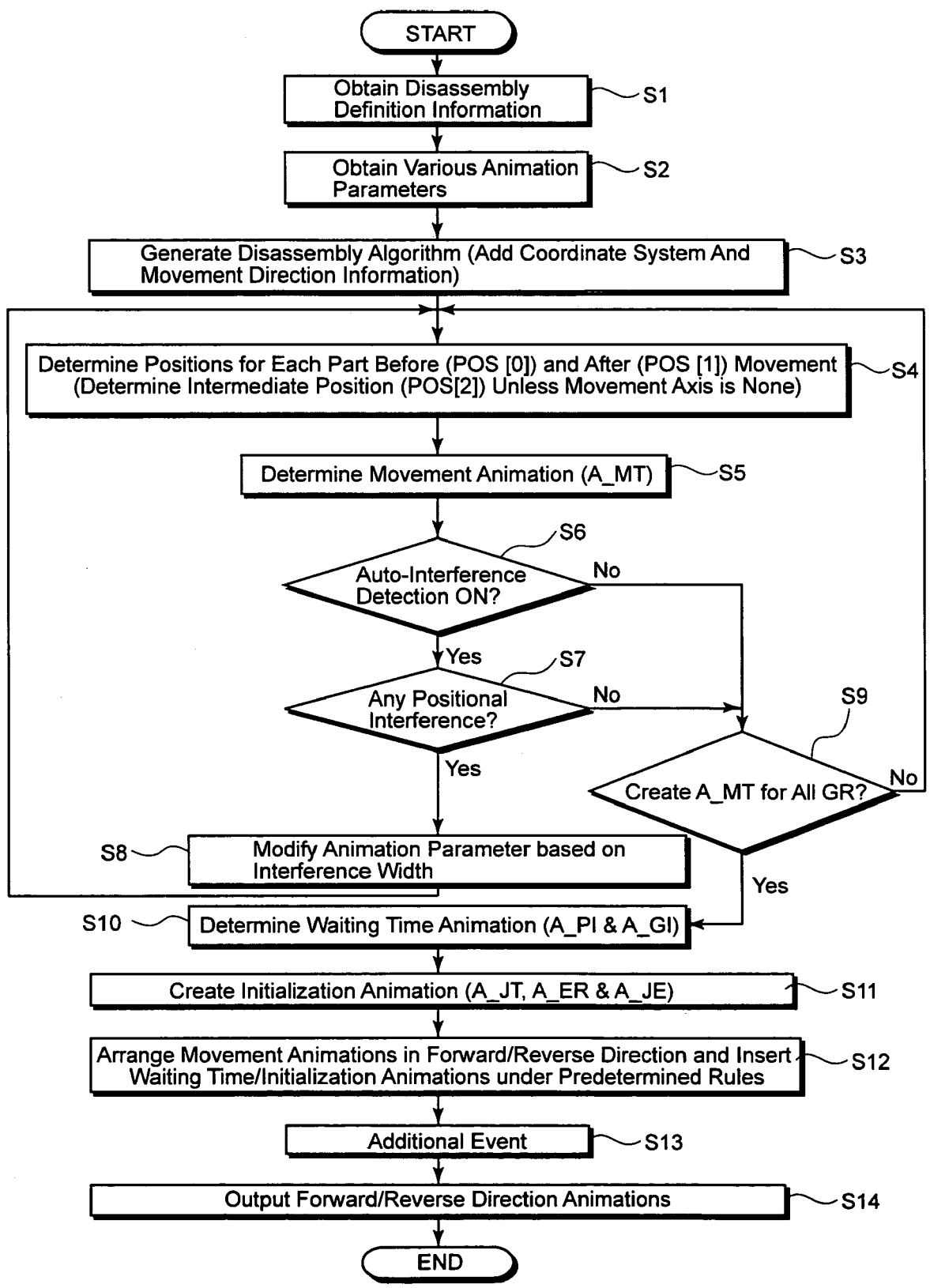
FIG. 11 are process drawings showing a generation of the disassembly algorithm and an animation.

Next, functions and operations of the disassembly algorithm generation unit 13 and the disassembly animation generation unit 14 will be described below in reference to a flowchart in FIG. 11. Steps S1-S14 described herein correspond to S1-S14 in the figure, respectively.

The disassembly algorithm generation unit 13 and the disassembly animation generation unit 14 obtain the disassembly definition information 11 (step S1); and based on this disassembly definition information 11, generate a disassembly algorithm for parts or parts groups in each process and generate the disassembly animation according to the disassembly algorithm for each of the basic processes, intermediate processes and connecting processes connecting the basic and intermediate processes according to various parameters: (1) an animation length (moving and waiting times), (2) an interpolation system in-between the start and end points, and (3) a disassembly coefficient for determining a disassembly moving distance (step S2-S12).

For convenience in the following description and accompanying drawings, symbols are used as below.

Namely, the following are used for input data:
(1) 3-Dimensional graphic data file (XVL file: shown as 8 in FIG. 4)
(2) Disassembly definition information (shown as 11 in FIG. 4)

Figure 12:
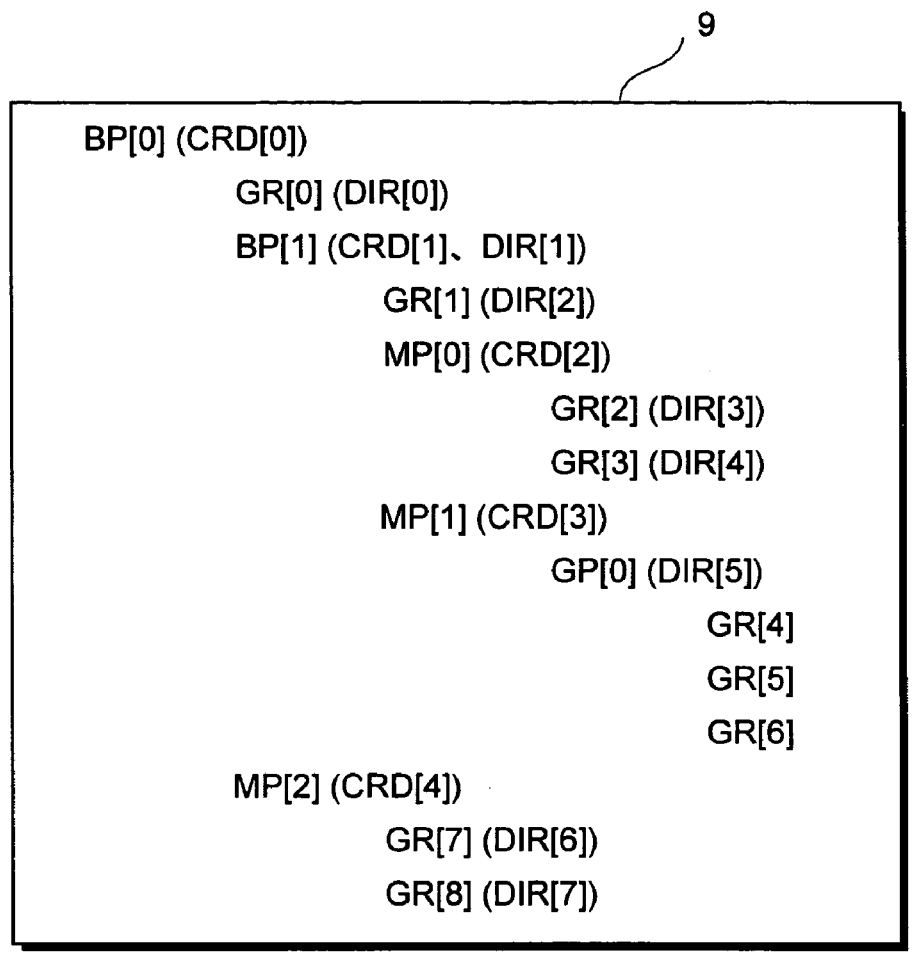
FIG. 12 is a schematic diagram describing the disassembly algorithm.

PP: Upper-level process
BP: Basic process
MP: Intermediate process
GP: Process parts group
GR: Parts (group)
(3) Animation generation parameters (stored in the disassembly definition information 11)
mt_length: Movement animation time length
mi_length: Waiting time between movement animations
pi_length: Waiting time between processes
intpl (None, X, Y, Z): Animation interpolation system
decomp: Disassembly coefficient
reuse: Reuse
Meanwhile, the following are used for output data:
(1) Movement animation (shown as 10 in FIG. 4)
A_MT (Movement Animation): Movement animation for parts
(2) Initialization animation (shown as 10 in FIG. 4)
A_JT (Jump Top Animation): Forward replay, process start
A_ER (End Return Animation): Forward replay, process return
A_JE (Jump End Animation): Reverse replay, process start
A_TR (Top Return Animation): Reverse replay, process return
(3) Waiting time animation (shown as 10 in FIG. 4)
A_GI (Group Interval Animation): Between movement animations
A_PI (Process Interval Animation): Between processes
(4) Events (stored in the animation 10)
The events are used for controlling the animation and serve two functions: connecting animations, and receiving user entries.
UE_Play: Forward replay
UE_Reverse: Reverse replay
UE_Pause: Pause
UE_Next: Jump to the beginning of the next process
UE_Prev: Jump to the beginning of the previous process
UE_First: Jump to the initial process
UE_Last: Jump to the last process
UE_Process_nnn: Jump to a process nnn
UE_Original: Jump to before the start of the process animation
UE_Final: Jump to after the end of the process animation First, the disassembly algorithm generation unit 13 creates a structure (algorithm 9) in the memory, as shown in FIG. 12 (step S3), based on the disassembly definition information 11. In other words, the disassembly algorithm generation unit 13 adds information of a coordinate system (CRD) and a movement direction (DIR) therealong, both of which become a disassembly basis of each of the parts and process parts groups, based on a basic/intermediate process structure defined in the disassembly definition information 11.

Only BP and MP have CRD. CRD is a coordinate system for the basic process base group. In the present example:
CRD [0] is the coordinate system of GR[0];
CRD [1] is the coordinate system of GR[1];
CRD [2] is the same as CRD [1];
CRD [3] is the same as CRD [1]; and
CRD [4] is the same as CRD [0].

On the other hand, BP, GP and GR comprise DIR. This DIR is used to approximate each shape under a process with a Bounding Box (a cube circumscribed around each shape: BB) and determine a disassembly direction and a position so that the BBs of a fitted part and a receiving part are apart by more than a specified fraction (disassembly parameter intpl) and the BB centers are apart by a minimum distance.

Thus the structure shown in FIG. 12 (disassembly algorithm 9) is generated.

The structure created in the above example is hereinafter referred to as PT (Process Tree). Functions and operations of the disassembly animation generation unit 14 will be described below.

The disassembly animation generation unit 14 first generates the movement animation A_MT for each of the parts. It then creates A_MT's for elements comprising DIR in PT from top to down.

Note that if the parameter reuse is ON, and if an animation of the corresponding element is present within the input, that animation becomes A_MT.

If no animation is present, POS [0] and POS [1] are generated from CRD and DIR (step S4):

POS [0]=Current position of the element
POS [1]=POS [0]+DIR within CRD

For an assembly animation, animation from POS [1] to POS [0] is created as A_MT (step S5). The animation time length of A_MT becomes the parameter mt length.

Note that if an axis other than NONE is specified for the parameter intpl in the steps S4 and S5, a position projected onto a plane orthogonal to a vector VEC=POS [0]−POS [1] as an axis is calculated. For example, POS [2] is generated as follows:

POS [2]=a point POS [0] is projected onto a plane which contains an axis's normal line and the position POS [1]

In this case, an animation playing POS [1]→POS [2]→POS [0] is A_MT.

Next, whether or not an automatic interference detection is ON is determined (step S6), and if it is ON, the disassembly animation modification unit 15 modifies the animation with the following system; i.e., the disassembly animation modification unit 15 comprises a function to determine whether or not the parts or parts groups interfere with each other during their movements. This function determines a shape which approximates a cube which surrounds each of the moving parts or parts groups based on the 3-dimensional graphic data, and determines the interference among the moving parts or parts groups according to the interference between each of the above shape (step S7). Then it sets the parameters of the above (1)-(3) so that the above interference does not occur (step S8). Specifically in this embodiment, an initial part position is shifted using an calculated interference width, and if there is a restriction for a shift position, the parts are rotated based on the interference width. However, the present invention is not limited by this system. After the parameters are modified, step S4 and later are repeated and a modified A_MT is generated.

The above process is repeated until all A_MT's are created in PT (step S9). For example, from the PT in FIG. 12, the following A_MT's are generated. When generating an animation for BP and GP, its movement elements are all of its lower-level GRs.

Next, the waiting time animations A_PI and A_MI are generated from the parameters mi_length and pi_length (step S10).

The initialization animations are generated from the A_MTs (step S11). Then each A_MT is sequenced in the order it is executed:

A_MT [0]→A_MT [2]→A_MT [3]→A_MT [4]→A_MT [5]→A_MT [1]→A_MT [6]→A_MT [7]

The initialization animations are generated and inserted along the arranged A_MT animation sequence. Simultaneously, A_PI and A_MI are also inserted. Animations are generated under the following rules (step S12).

Initialization animations (A_JT, A_ER, A_TR and A_JE) are generated while sequentially applying individual elements of the animation sequence. Whenever arriving at an appropriate point corresponding to the start/end of each process in the animation sequence, a state at the point is taken as a snapshot and used to generate an initialization animation.

For the processes (BP [0], BP [1], MP [0], MP [1] and MP [2]),

A_JT is generated at the beginning of the forward direction.

A_ER is generated at the end of the forward direction.

A_TR is generated at the beginning of the reverse direction.

A_JE is generated at the end of the reverse direction.

For in between the movement animations,

If A_MT becomes adjacent to A_JT, A_ER, A_TR or A_JE after an insertion thereof, A_MI is inserted.

A_PI is inserted immediately after A_JT and A_JE. A_PI is inserted immediately before A_T and A_ER.

Two animation sequences; i.e., a forward direction animation sequence and a reverse direction animation sequence are generated. An example of a forward direction animation sequence is shown below:

A_JT [0]→A_PI→A_MT [0]→A_JT [1]→A_PI→A_MT [2]→$A_{13}$ JT [2]→A_PI→A_MT[3]→A_MI→A_MT [4]→A_PI→A_ER[0]→A_JT   [3]→A_PI→A_MT [5]→A_PI→A_ER   [1]→A_ER   [2]→A_PI→A_MT [1]→A_JT   [4]→A_PA→A_MT   [6]→A_MI→A_MT[7]→A_PI

Here, the movement animation and the initialization animation are generated by adding information of a camera view point. In the present embodiment, this camera view point is set using a view point of when the animation is generated. However, this camera view point can be specified for each process animation and each animation of a process connecting processes as described below.

Then the disassembly animation generation unit 14 generates events connecting animations (step S13). Events are generated for each animation of the forward direction animation sequence and the reverse direction animation sequence.

An event EV [i] is executed on the completion of AN [i], when AN [i] is set as an i-th element of the animation sequence. EV [i] performs the following process:

| Animation | Corresponding element | Movement element |
|---|---|---|
| A_MT[0] | GR[0] | GR[0] |
| A_MT[1] | BP[1] | GR[1], GR[2], GR[3], GR[4], GR[5] and GR[6] |
| A_MT[2] | GR[1] | GR[1] |
| A_MT[3] | GR[2] | GR[2] |
| A_MT[4] | GR[3] | GR[3] |
| A_MT[5] | GP[0] | GR[4], GR[5] and GR[6] |
| A_MT[6] | GR[7] | GR[7] |
| A_MT[7] | GR[8] | GR[8] |

```
if ( animation is being replayed )
{
    if ( forward direction replay)
        execute AN [i+1]
    else if ( reverse direction replay)
        execute AN [i−1]
    }
    else
    {
    stop animation
    }
```

The disassembly animation generated as above is output to and stored in the data storage unit 6 (step S14).

The generated animation may be replayed for verification by starting the disassembly animation replay control unit 16. If there are any problems with the replayed animation, the user may start the disassembly animation modification unit 15 to modify a section in question in the animation.

Specifically, the user modifies the movement animation in each process by modifying (1) a position, (2) a bearing or (3) a scale of each of the parts or parts groups for each animation constituting the basic process, the intermediate process and the connecting processes connecting the basic and intermediate processes.

The user also may start the disassembly animation modification unit 15 to determine the interference among the parts or parts groups. As described above, this function determines a shape which approximates a cube which surrounds each of the moving parts or parts groups based on the 3-dimensional graphic data, and determines the interference among the moving parts or parts groups according to the interference among each of the above shapes.

This embodiment further provides a function to modify the camera view point information to thereby modify the animation for each basic process or intermediate process.

Below, the structure and functions of the disassembly illustration generation unit 20 will be described.

This disassembly illustration generation unit 20 generates disassembly illustrations based on the disassembly algorithm (or modified disassembly algorithm), wherein minimum disassembly units of the disassembly illustrations are parts and parts groups assigned with a reference numeral/symbol.

In the disassembly algorithm example of FIG. 12, the reference numerals/symbols are assigned to the parts (GR) or process parts groups (GP) directly belonging to the basic process, and to the parts or process parts group (GP) directly belong to the intermediate processes (MP): i.e., GR1, GR2, GR3, GP0, GR7 and GR8 in this example.

This disassembly illustration generation unit 20 refers to the disassembly algorithm, considers the parts or parts groups assigned with the reference numeral/symbol as minimum disassembly units, determines respective post-disassembly positions of the parts groups using the same engine as that of the disassembly animation generation unit, and generates a post-disassembly illustration. In this disassembly illustration, the reference numeral/symbols are displayed with a respective lead line for each of the parts and parts groups, as shown in FIG. 1, by a predetermined algorithm.

Figure 39:
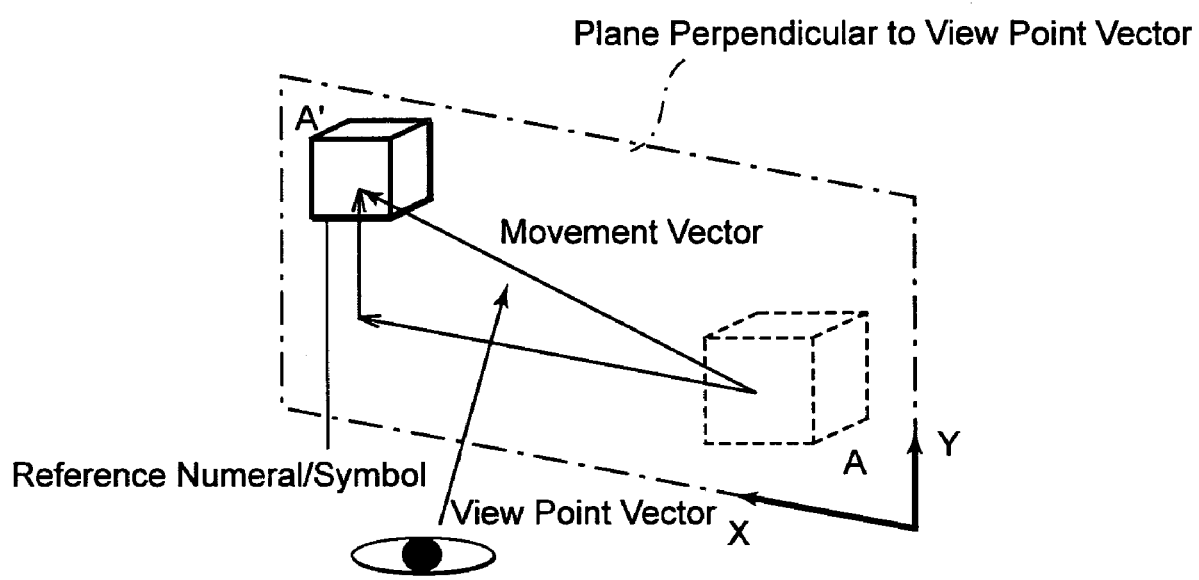
FIG. 39 is a diagram describing an algorithm for drawing a lead line.

FIG. 39 is a schematic view describing an algorithm for drawing lead lines and reference numerals/symbols with the disassembly illustration generation unit 20.

Here, A and A' are object positions before and after the movement, respectively. In this case, a movement vector AA' is projected onto a plane perpendicular to a view point vector from a view point (defined with x- and y-axes perpendicular to the view point vector). Then a lead line is drawn along an axis direction of a shorter component of the projected vector. In the present figure, since the shorter component of the projected movement vector is the y-axis component, the lead line is drawn from the post-movement object along the y-axis.

In the example of this figure, any direction would be reasonable since there is only one object. However, when applying the above algorithm to a result of a disassembly of a plurality of objects along the movement vector, the lead lines and reference numerals/symbols do not overlap.

This embodiment further provides a function to modify the camera view point information to thereby modify this disassembly illustration.

Figure 13:
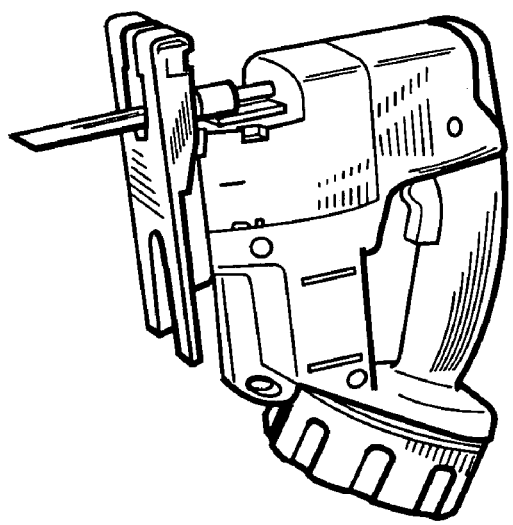
FIG. 13 is a diagram showing 3-dimensional graphic data of an electric saw as one example.

Generation of the disassembly definition information (parts list), generation of the disassembly algorithm based on the disassembly definition information (parts list), and generation and modification of the animation will be described below using an example of an electric saw assembly process shown in FIG. 13. The 3-dimensional graphic data for this electric saw is stored in the data storage unit 6 in an XVL file named "nokogiri.xv3".

Figure 14:
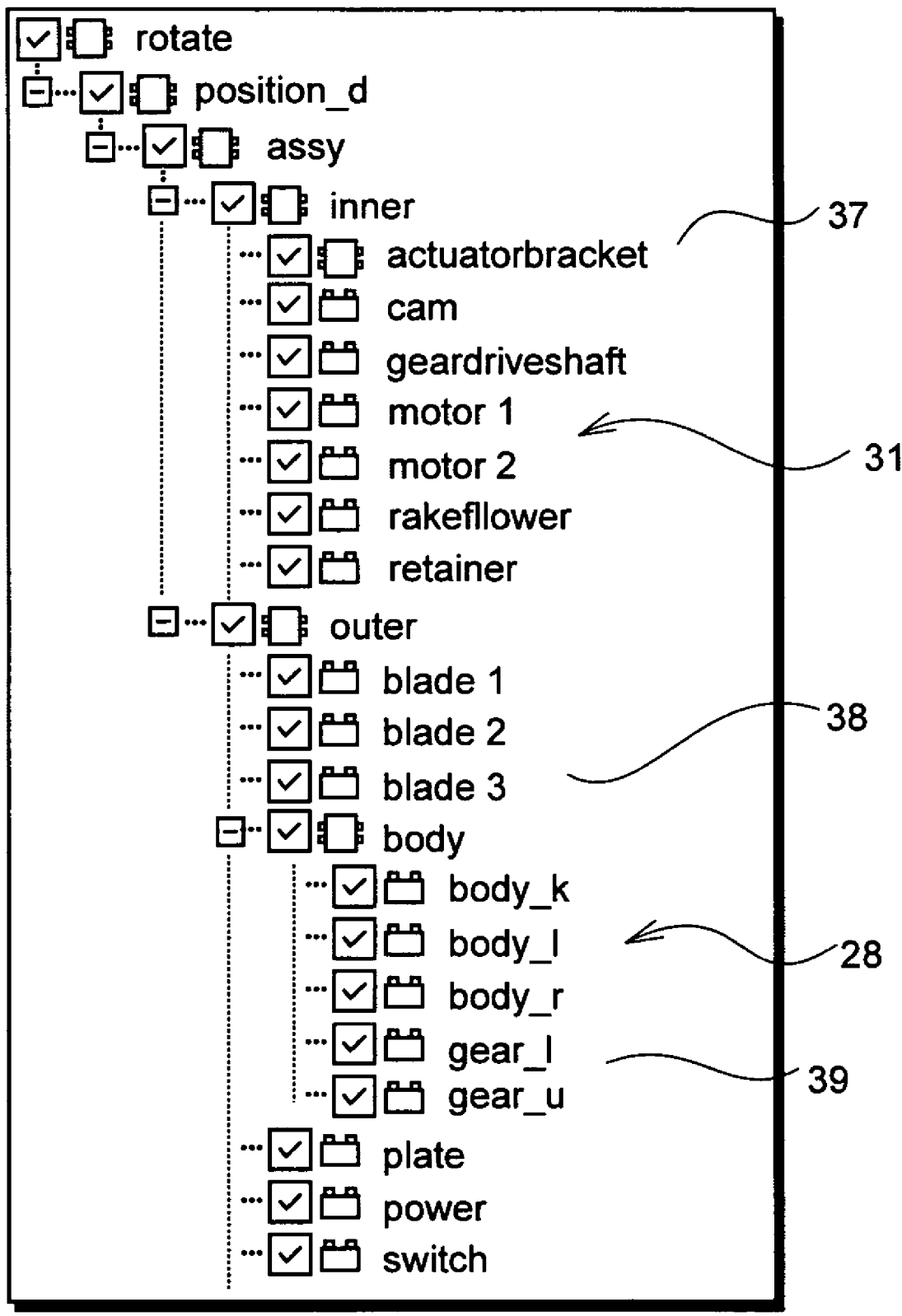
FIG. 14 is a panel showing a parts assembly structure.

Stored in this XVL file is a group structure of each part constituting the saw, and when displayed, they look like the one shown in FIG. 14. In this embodiment, this screen in FIG. 14 is called a "group editing panel" and designed to allow editing of the group structure of the parts with various menu commands (not shown).

Based on this XVL file, the disassembly definition information is generated.

Figure 15:
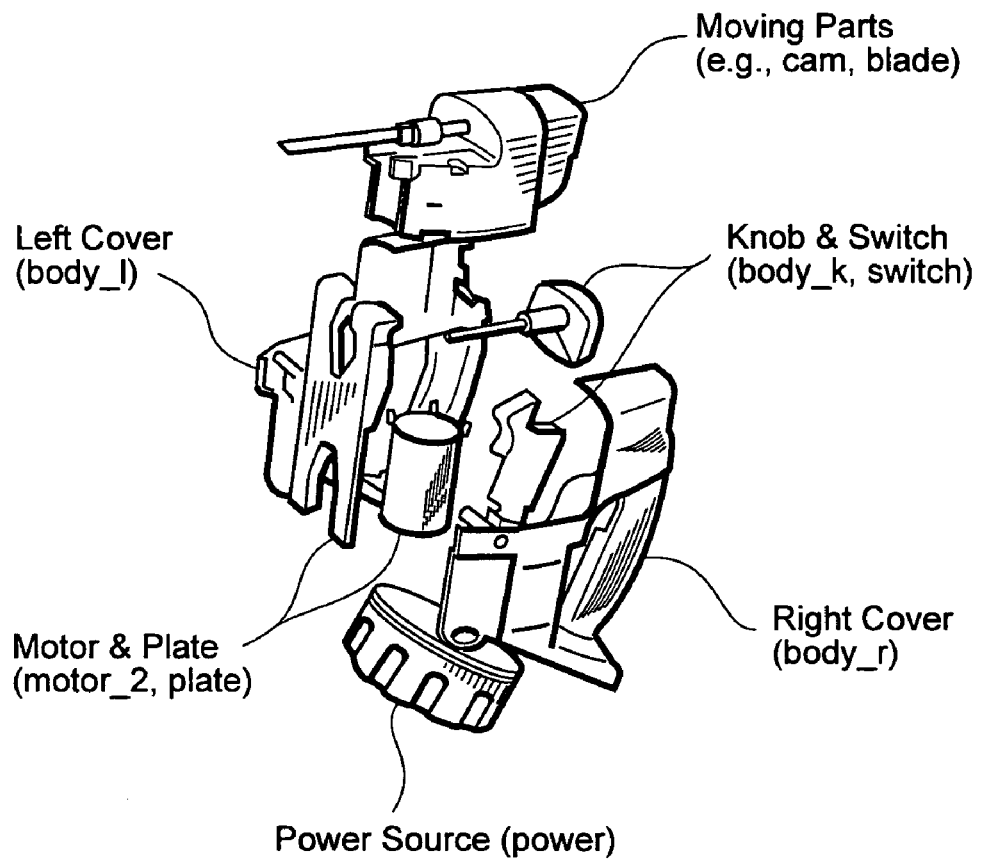
FIG. 15 is a diagram describing the concept of a parts assembly order.

In order to generate this disassembly definition information, it should be first considered how the electric saw is disassembled or assembled. The structure of this electric saw is shown in FIG. 15. As a simple assembly procedure, the following is considered in which parts are assembled to a left cover and a right cover closes:

1. Moving parts are assembled to the left cover.
2. A motor, a knob, a switch, a power source and the like are assembled onto.
3. The right cover is assembled to close the entirety.
4. A plate is assembled to finish the product.

However, the moving parts consist of a plurality of parts and these parts should be assembled before assembling the entire saw. Therefore, in this procedure the moving parts are assembled together before the assembly of the above 1.

Figure 16:
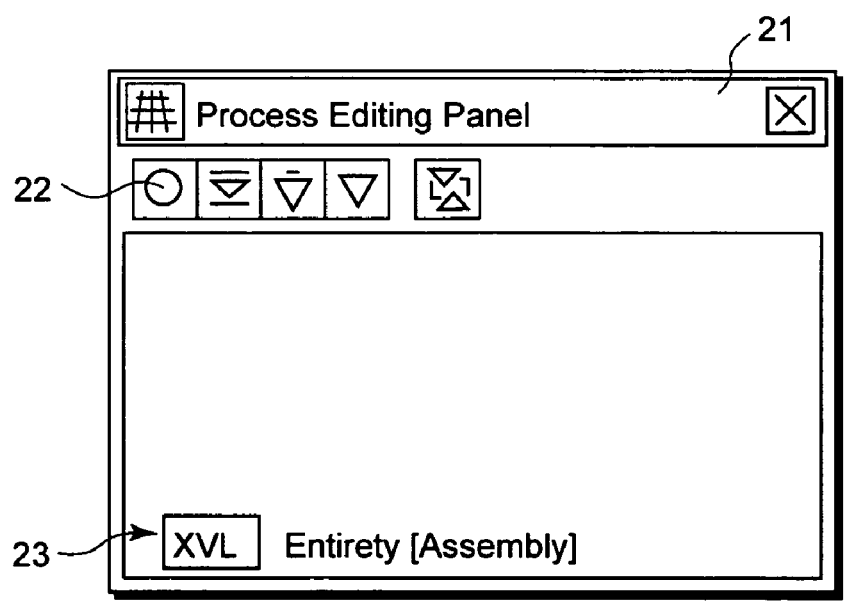
FIG. 16 is a diagram showing a creation of a process structure (disassembly definition information) using a process editing panel.

The disassembly definition information is generated using a process editing panel 21 as shown in FIG. 16 and later. In this embodiment, by creating processes in the process editing panel 21 the disassembly definition information generation unit 17 structures those processes as the disassembly definition information 11 and stores them in the data storage unit 6, as described above.

Figure 17:
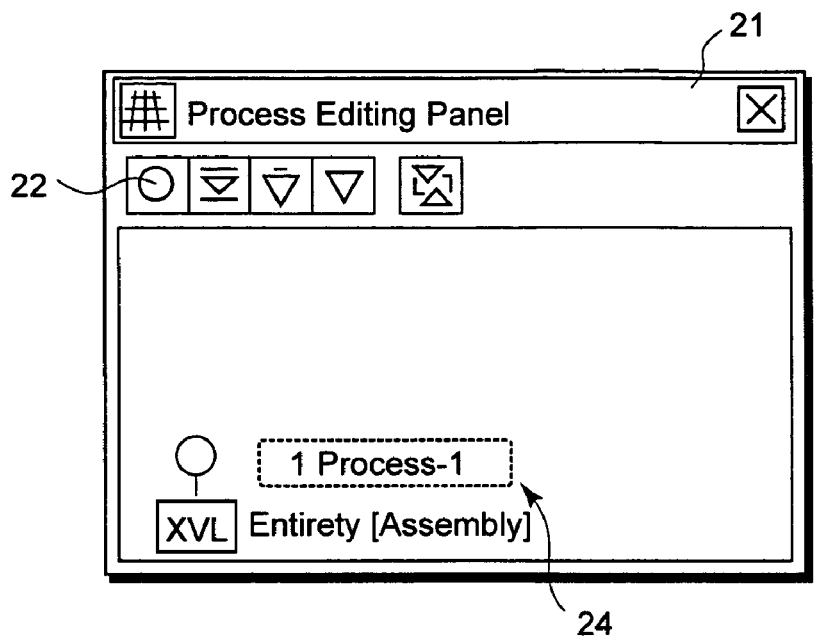
FIG. 17 is a diagram showing the creation of the process structure (disassembly definition information) using the process editing panel.

First, as shown in FIG. 16, a ○ button 22 at the top and "Entirety [Assembly]" 23 at the bottom of the process editing panel 21 are clicked in this order. Next, the "Entirety [Assembly]" 23 is right-clicked to add a basic process. Thus a process 24 called "Process-1" is generated as shown in FIG. 17.

Figure 19:
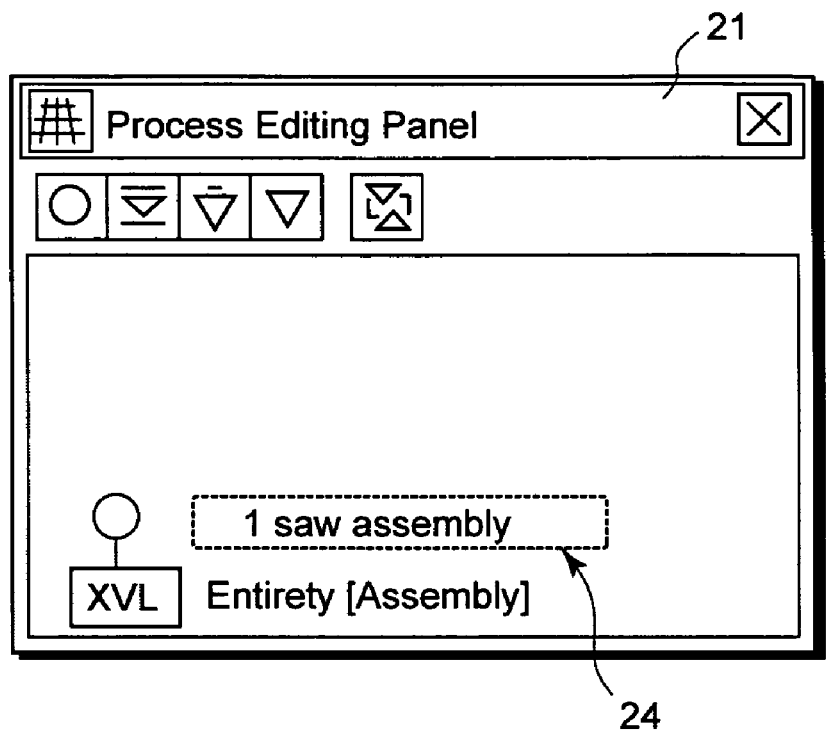
FIG. 19 is a diagram showing the creation of the process structure (disassembly definition information) using the process editing panel.

Since the name "Process-1" does not readily convey its contents, this process is now renamed to indicate that it contains the entire saw assembly. When double clicking "1 Process-1" 24, "Process properties" dialog 26 for the process appears as shown in FIG. 18. In a field next to "user ID", "saw assembly" is entered to rename the process. After changing the user ID, an OK button is clicked to implement the process name change in the process editing panel 21 as shown in FIG. 19.

Now assembly elements are added to this process. Previously, various parts were assembled to the "left cover". Parts to which other parts are assembled, such as this "left cover", are called "base parts", and they are each positioned at the beginning of their respective base process indicated as ○ and displayed with "∇+vertical line under".

Then "body_1" (the left cover) is added as a base part of the process in one of the following 3 systems:

(1) Select the "body_1" 28 in the "group editing panel" (FIG. 14). Click a "∇ button" 25 and then click a "○ 1 saw assembly" 24 in the process editing panel 21 as shown in FIG. 20.

(2) Select the "body_1" 28 in the "group editing panel" and right-click the "○1 saw assembly" 24 in the process editing panel 21 to add a group.

(3) Right-click the "body_1" 28 in the "group editing panel" to perform copying. Then right-click the "○ 1 saw assembly" 24 in the process editing panel 21 to perform pasting.

Figure 20:
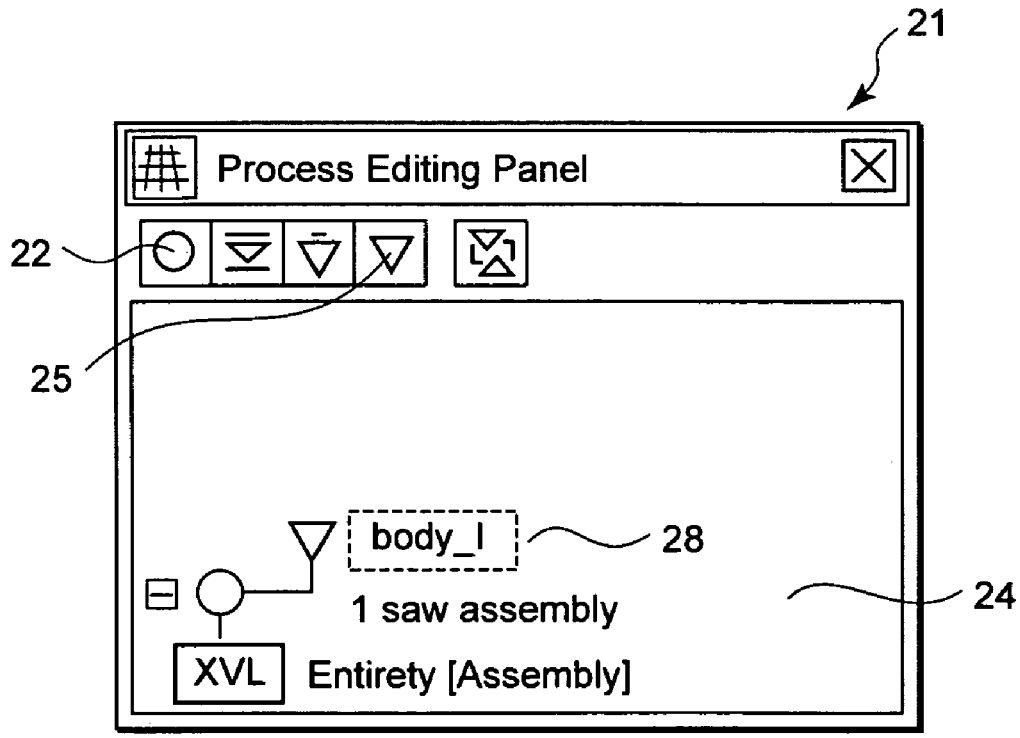
FIG. 20 is a diagram showing the creation of the process structure (disassembly definition information) using the process editing panel.

After the "left cover" is added as the base part of the process, the "7 body_1" 28 is added at the beginning of the process, as shown in FIG. 20.

Now parts assembled to the base part will be added. First, "moving parts" are added. Since these "moving parts" were considered to be separately assembled together before being added to the "left cover" in the assembly procedure above, a process for these "moving parts" needs to be added.

A basic process is added in one of the following 2 systems:

(1) Click the "○ button" 22 at the top of the "process editing panel" 21 and then click an insert bar displayed at the bottom of the "▽ body_1" 28.

(2) Right-click the "▽ body_1" 28 to add a basic process.

Figure 21:
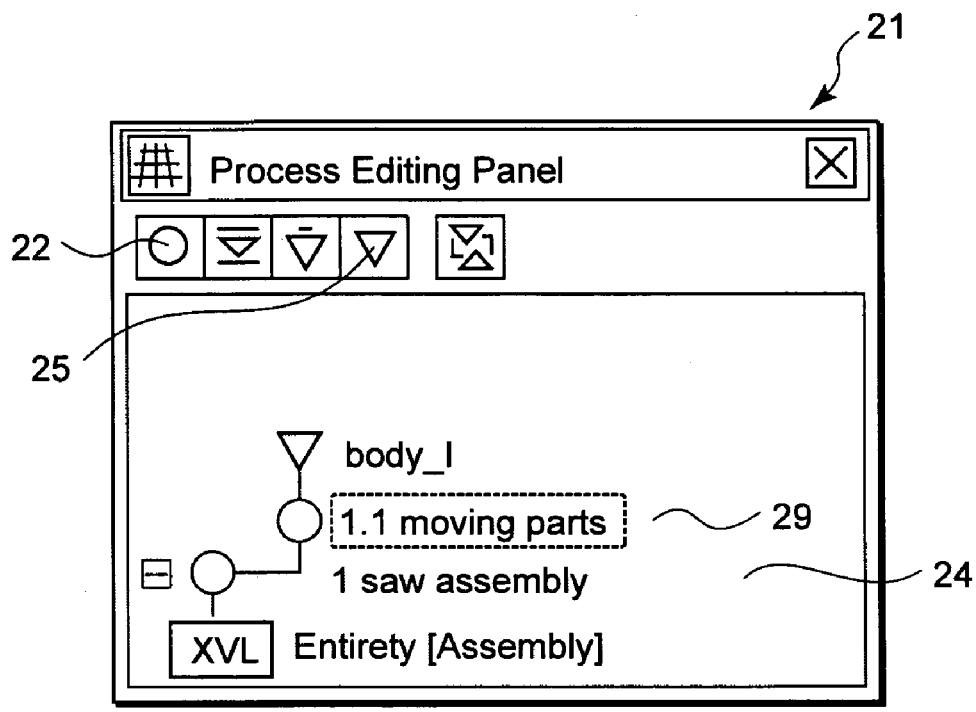
FIG. 21 is a diagram showing the creation of the process structure (disassembly definition information) using the process editing panel.

Name it "moving parts." "○ 1.1 moving parts" 29 is added as shown in FIG. 21.

Although this "○ 1.1 moving parts" 29 should be added with its components to create a process to assemble the "moving parts", here, the "○ 1 saw assembly" 24 process for assembling parts to the "left cover" will be completed first. Then, the "○ 1.1 moving parts" 29 will be designed.

Next the "motor", the "knob", the "switch", the "power source", the "right cover" and the "plate", which are to be assembled to the "left cover", are added to the "○ 1 saw assembly" 24. Unlike the "moving parts," these parts do not require individual assemblies. For such a part, the "intermediate process" is used with an icon "▼+upper and under lines".

An intermediate process is added in one of the following 2 systems:

(1) Click the "▼+upper and under lines" 27 at the top of the "process editing panel" 21 and then click the insert bar displayed at the bottom of the "○ 1.1 moving parts" 29.

(2) Right-click the "○ 1 saw assembly" 24 to add an intermediate process.

Name it "motor assembly."

Figure 22:
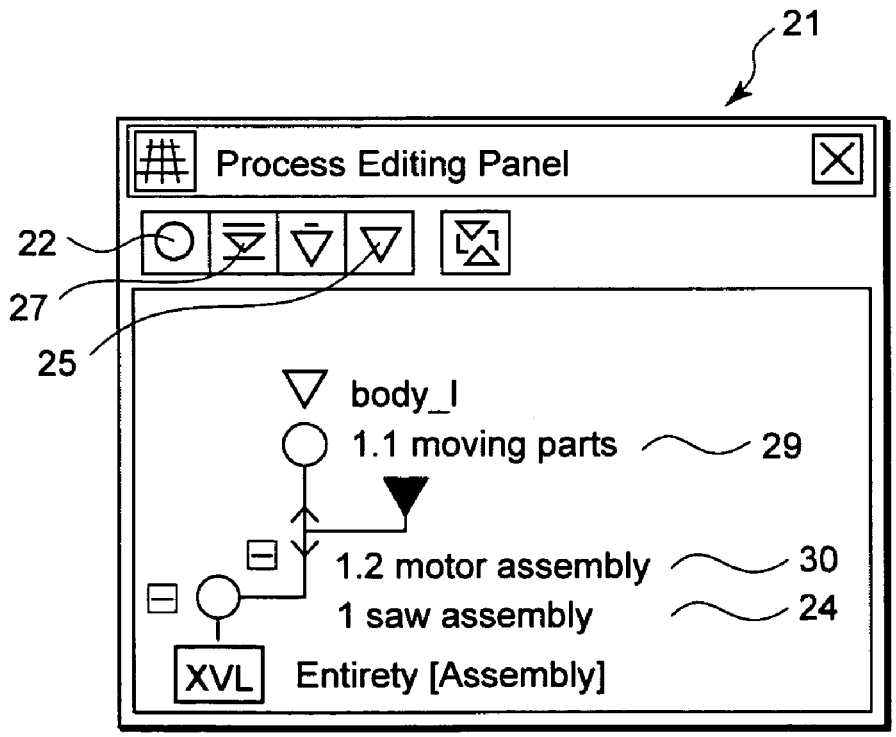
FIG. 22 is a diagram showing the creation of the process structure (disassembly definition information) using the process editing panel.

In this manner, an intermediate process "1.2 motor assembly" 30 with an icon "▼+underline" can be created, as shown in FIG. 22.

Next a part (group) representing the "motor" is added to the "1.2 motor assembly" 30.

"motor 2" is added in one of the following 3 systems:

(1) Select the "motor 2" 31 in the "group editing panel" (FIG. 14). Click "▼ button" 25 in the process editing panel 21 and then click the "1.2 motor assembly" 30.

(2) Select the "motor 2" 31 in the "group editing panel" and right-click the "1.2 motor assembly" 30 in the process editing panel 21 to add a group.

(3) Right-click the "motor 2" 30 in the "group editing panel" to perform copying. Then right-click the "1.2 motor assembly" 30 in the process editing panel 21 to perform pasting.

Figure 23:
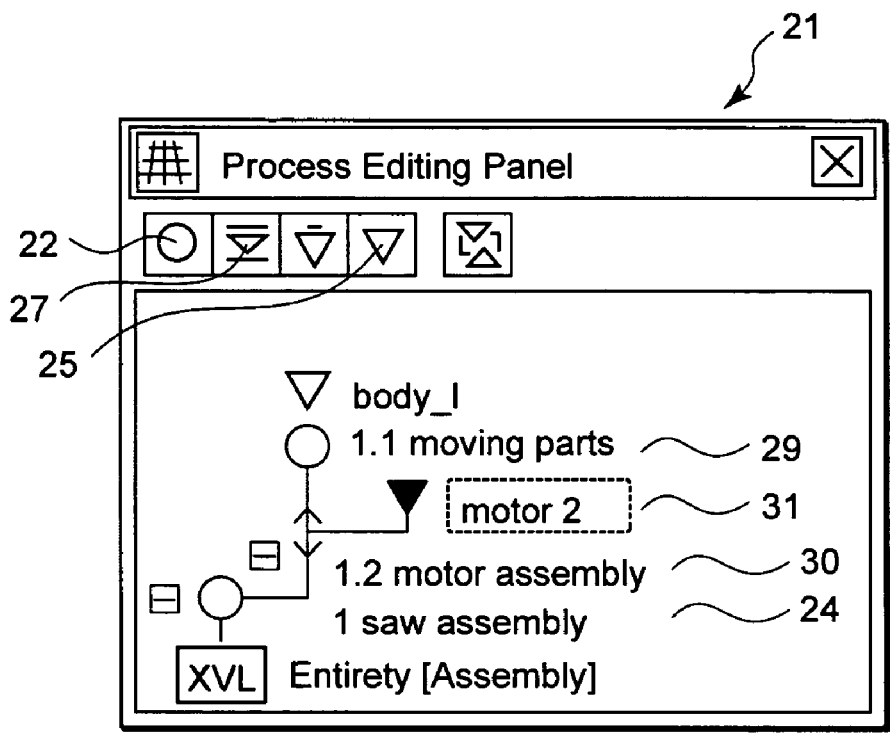
FIG. 23 is a diagram showing the creation of the process structure (disassembly definition information) using the process editing panel.

The result is shown in FIG. 23. Parts belonging to the intermediate process have a different color from that of the "▽ body_1" and displayed in the way "▼ motor 2" 31 is shown. In a similar manner, assembly processes for the "knob", the "switch", the "power source", the "right cover" and the "plate" are created to finally generate a process shown in FIG. 24B.

Now the "1.1 moving parts", which has been left with no component, is edited.

Figure 25:
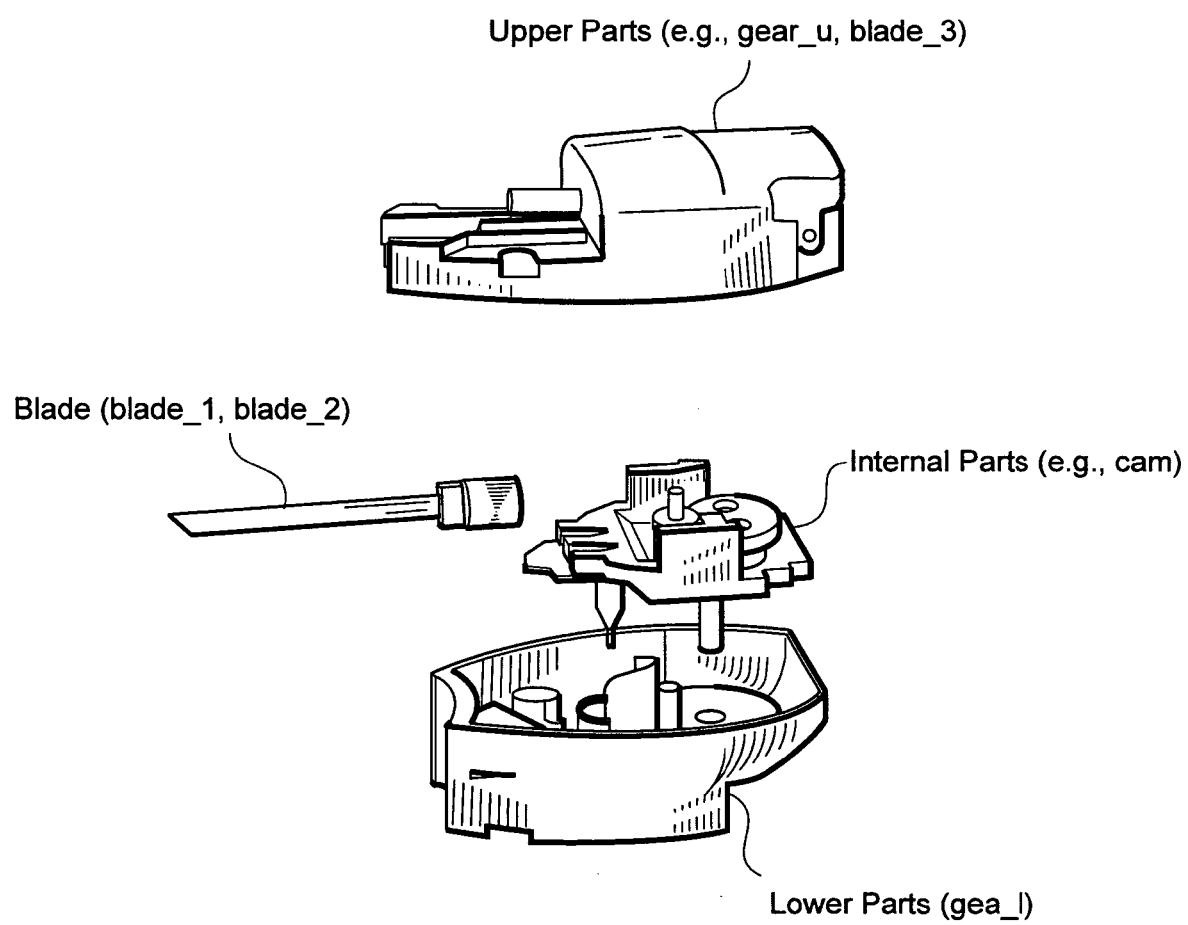
FIG. 25 is a diagram showing the concept of a disassembly process design of moving parts.

In an analogous fashion to the above, the "moving parts" assembly flow will be considered by disassembling these "moving parts" as shown in FIG. 25. It may be determined that the easiest way is to apply a simple flow such as the following:

1. With "lower parts" as a base, sequentially assemble each group of "internal parts."

2. Assemble "upper parts." Although the "upper parts" consists of a plurality of groups, it is considered and assembled as one part.

3. Assemble a "blade." Although the "blade" also consists of 2 groups, it is considered and assembled as one part.

Figure 24A:
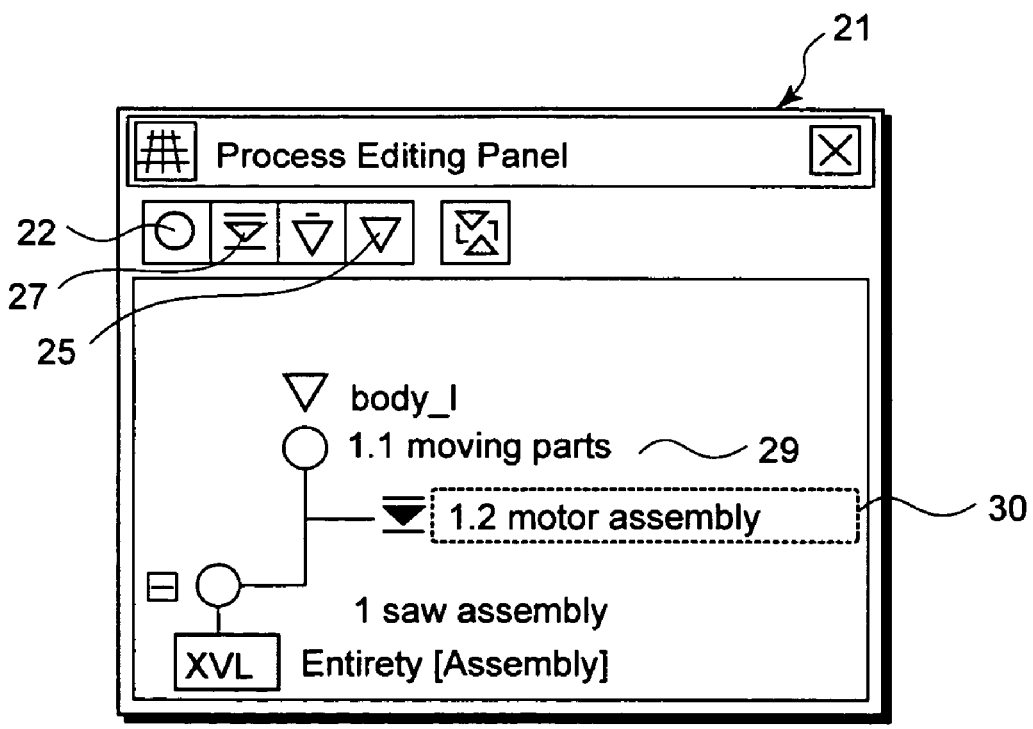
FIG. 24 is a diagram showing the creation of the process structure (disassembly definition information) using the process editing panel.

According to the above procedures, processes will be designed as below:

In FIG. 24A, the first base "lower parts" is added in the "○ 1.1 moving parts" 29 of the process editing panel 21. This procedure is similar to the creation of the "body_1" 28.

Figure 24B:
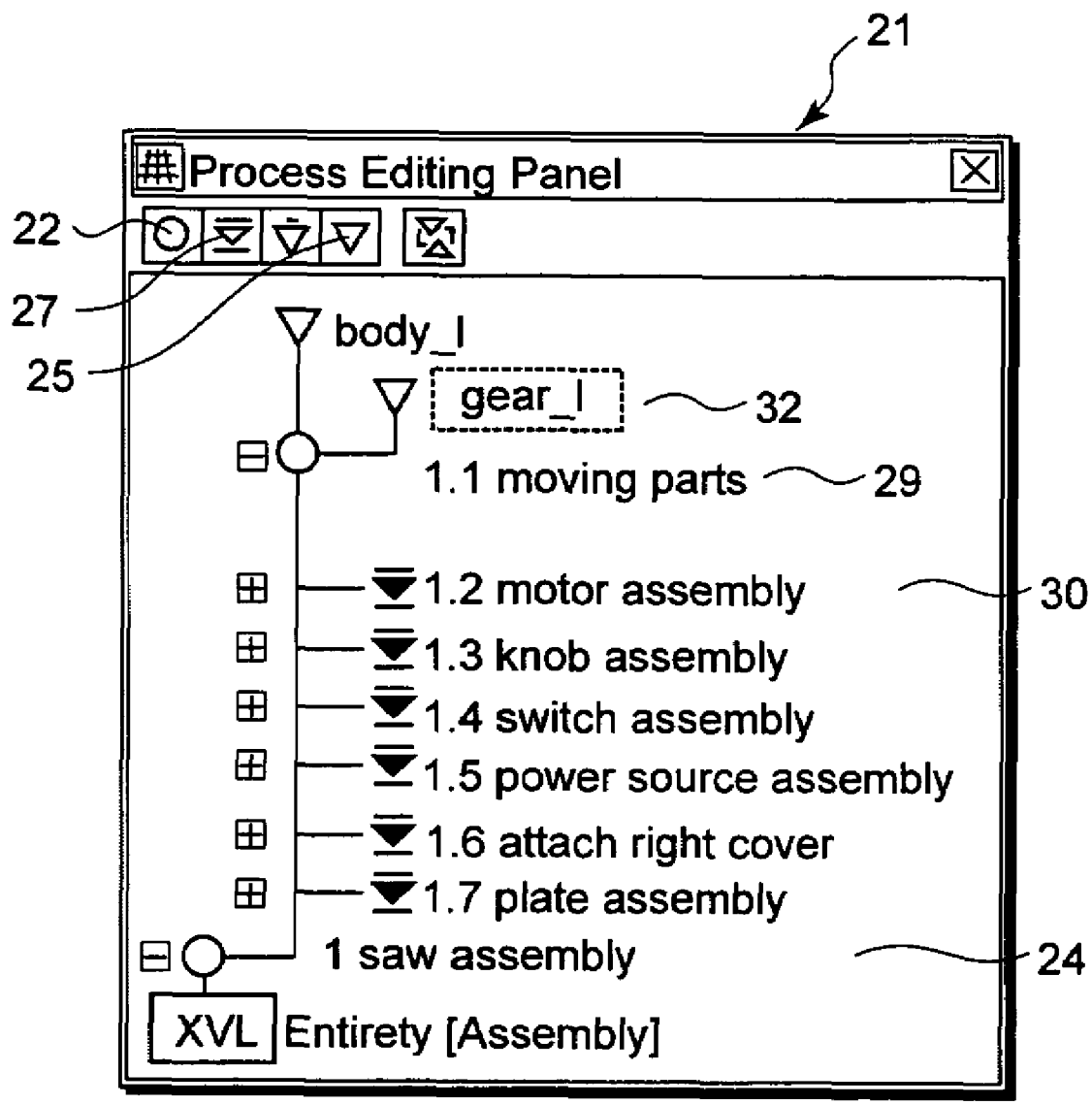

The process becomes as shown in FIG. 24B with "gear_1" 32 added.

Next an intermediate process (▼+underline) to assemble the "internal parts" is created. Although the previously created intermediate process had only one part, intermediate processes may each contain a plurality of parts. Here, a process "internal parts assembly" is created as a process to assemble all parts constituting the "internal parts".

1. An intermediate process "1.1.1 Process-1" is created after the "gear_1" 32.

2. Then the above internal process is re-named to "1.1.1 internal parts assembly" in the "Process properties" dialog 26.

3. From the group editing panel, groups constituting the "internal parts" are selected and added to the "1.1.1 internal parts assembly." Positional relationships are considered and groups are added in the following order so that parts do not interfere with each other during the assembly.

(a) "motor_1"
(b) "geardriveshaft"
(c) "retainer"
(d) "rakefllower"
(e) "cam"

Figure 26:
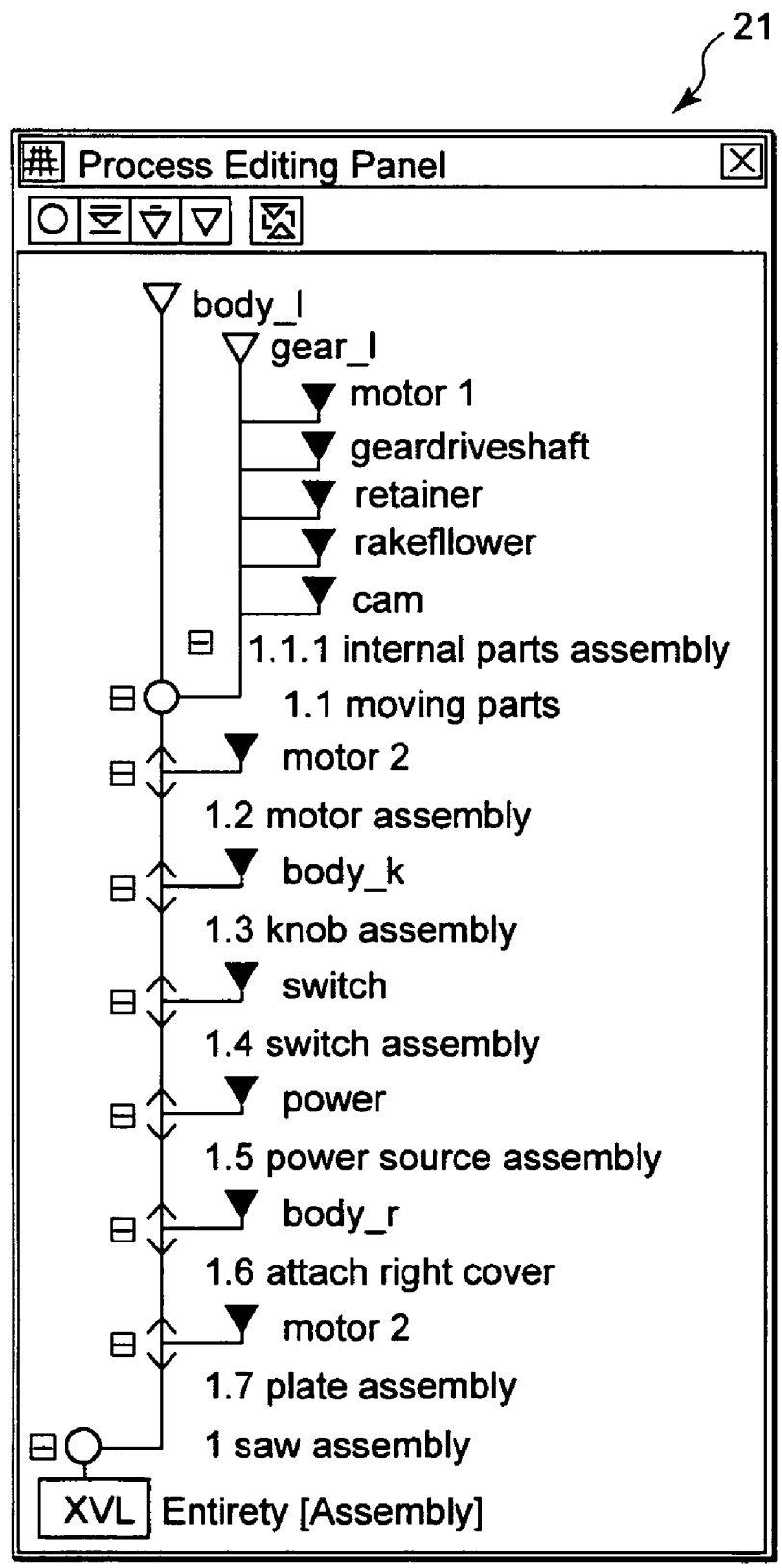
FIG. 26 is a diagram showing the creation of the process structure (disassembly definition information) using the process editing panel.

As a result, processes are structured as shown in FIG. 26.

Now processes are created to assemble the "upper parts" and the "blade." For both the "upper parts" and the "blade," a plurality of parts will be treated as one part during the assembly. When a plurality of parts (groups) with no accompanying assembly structure should be treated as one part as above, a "process parts group" with an icon "▽+⎯" is used, or an icon "▼+⎯" is used when it is included in the intermediate process.

Next an intermediate process for assembling "upper parts" is created using the process parts group.

Figure 27:
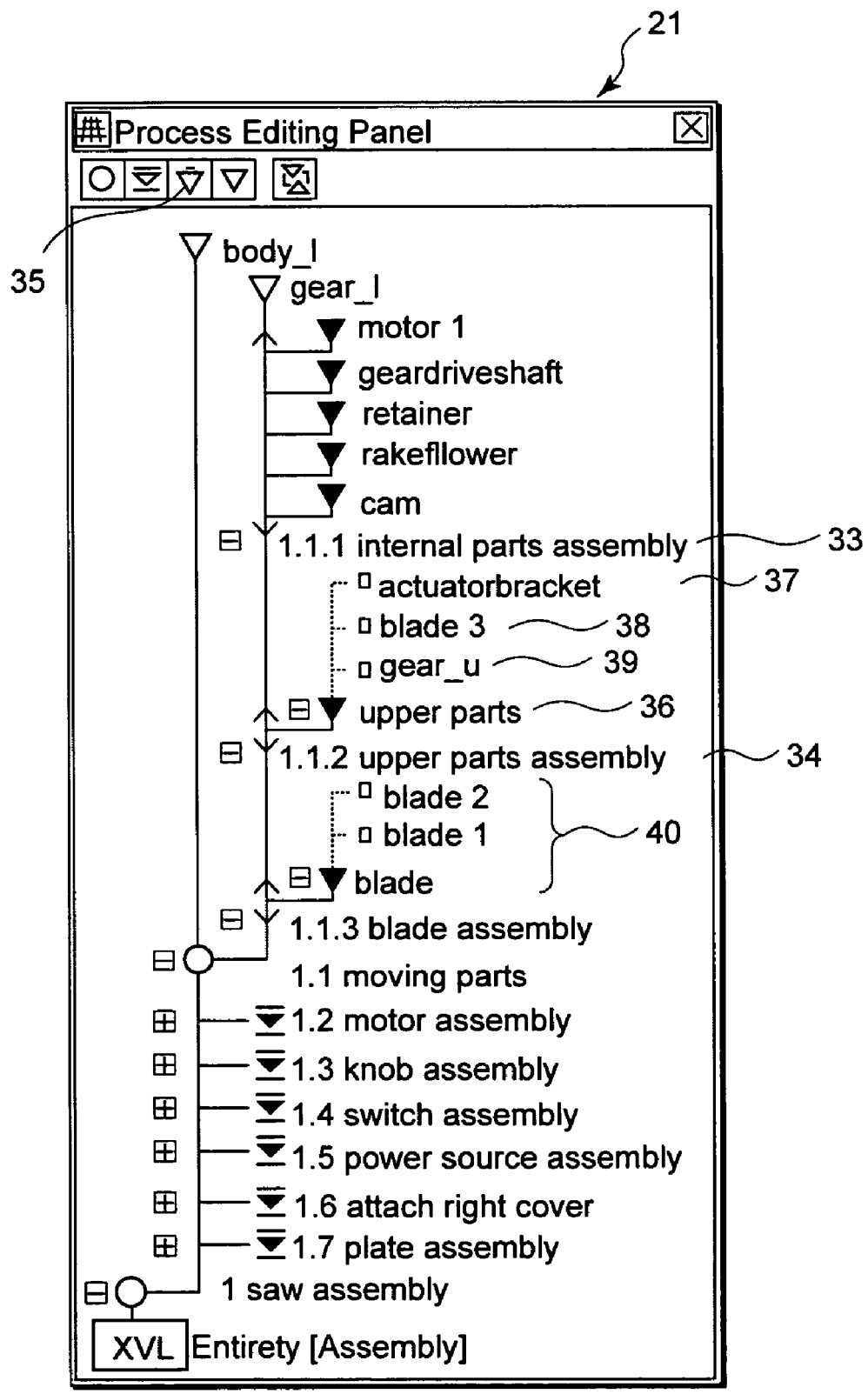
FIG. 27 is a diagram showing the creation of the process structure (disassembly definition information) using the process editing panel.

1. An intermediate process named "'▼+_' 1.1.2 upper parts assembly" 34 is created after the "'▼+⎯' 1.1.1 internal parts assembly" 33, as shown in FIG. 27.

2. A process parts group is created in one of the following 2 systems:

(1) Click the "▽+⎯" 35 at the top of the "process editing panel" 21 and then click the "1.1.2 upper parts assembly" 34.

(2) Right-click the "1.1.2 upper parts assembly" 34 to add a process parts group. A process parts group "Group-1" is created below. Rename it to "upper parts" 36 in the "Process properties" dialog 26. Then this process parts group is displayed as "'▼+⎯' upper parts" 36 in the process editing panel 21.

3. In the group editing panel (FIG. 14), select "actuator-bracket" 37, "blade3" 38 and "gear_u" 39 to add to the "upper parts" 36 in FIG. 27. Then "groups included in the process parts group" are each added and displayed with an icon "☐".

It should be mentioned that the order in the process parts group is irrelevant to the parts assembly order and therefore, the "actuatorbracket", the "blade3" and the "gear_u" may be added in any order.

Similarly, a process parts group is utilized for the "blade" and processes are created as indicated as 40 in FIG. 27. Thus processes in FIG. 27 are structured to conclude the process design.

In this case, the parts list, as shown in FIG. 2, may be also directly entered as disassembly definition information without the above interface. This parts list should be created such that parts or parts groups belonging to the base process (▽) are assigned to the level 1, and parts or parts groups belonging to one or more dependent intermediate processes (▼) are assigned to a level 2 or later.

Thus after the disassembly definition information or parts list is prepared, the reference numeral/symbol assignment unit 19 sequentially assigns the reference numeral/symbol to parts or parts groups constituting the intermediate process.

Next, animation generation by the disassembly animation generation unit 14, and animation replay by the disassembly animation replay control unit 16 will be described below.

Figure 28:
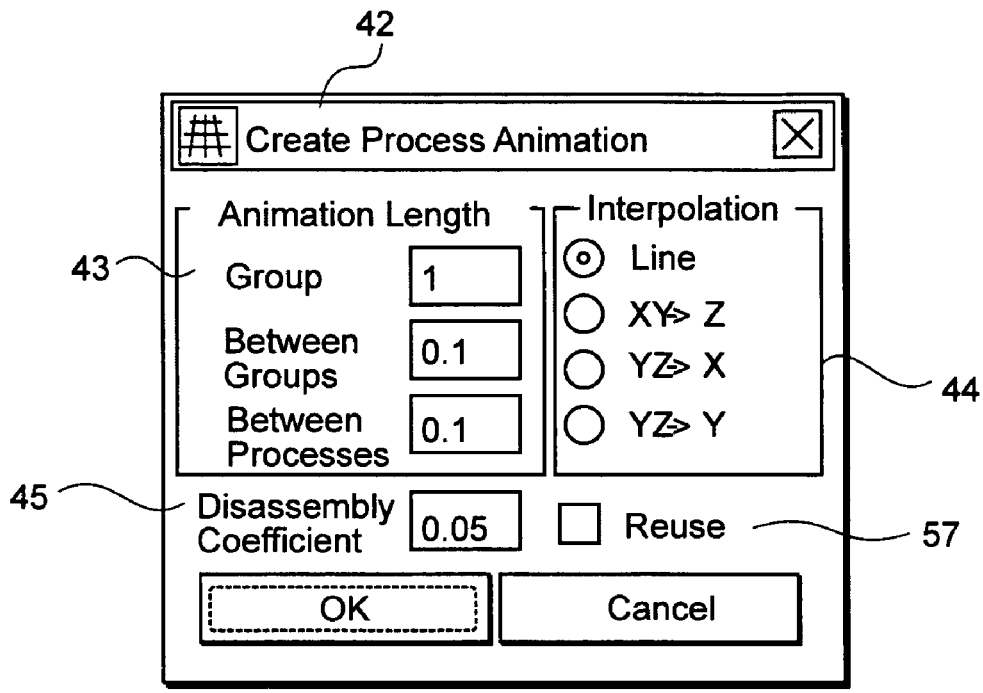
FIG. 28 is a diagram showing a parameter entry system for a process animation.

Based on the processes designed above, the disassembly animation generation unit 14 executes an automatic generation of animations. This starts by selecting a "create process animation" command from a menu bar (not shown). By specifying this command, "Create process animation" dialog box 42 is displayed as shown in FIG. 28. After verifying or specifying an animation length 43, an interpolation system 44 for in between the start and end points of animation, and various parameters of a disassembly coefficient 45, and pressing the OK button in this "Create process animation" dialog box 42, a process animation is generated by the system described above.

Figure 29:
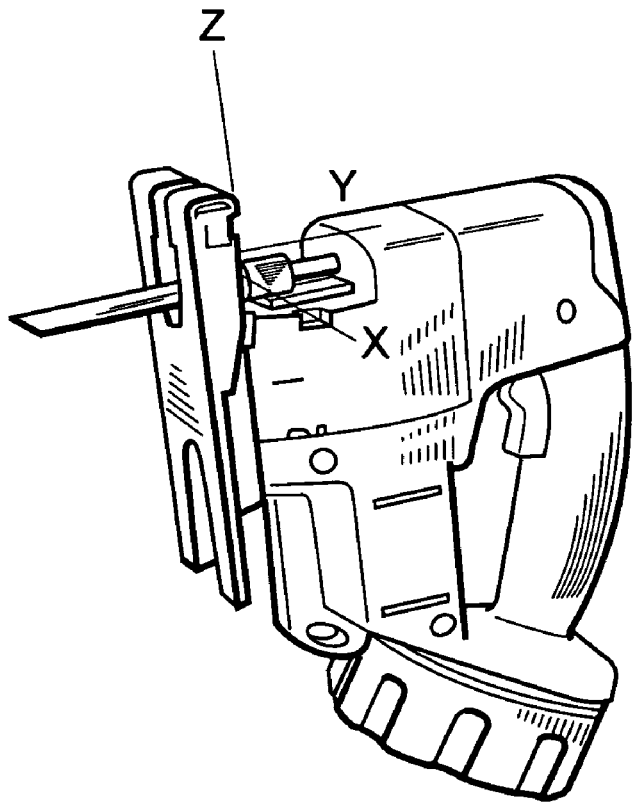
FIG. 29 is a diagram showing a system for setting a view point.

At this point a camera animation is also automatically generated and its view point is based on the state when the generation occurred. Therefore, if the view point is slightly inclined as shown in FIG. 29 before automatically creating the animation and then performing the process animation, the updated view point is used to generate the disassembly animation.

Figure 30:
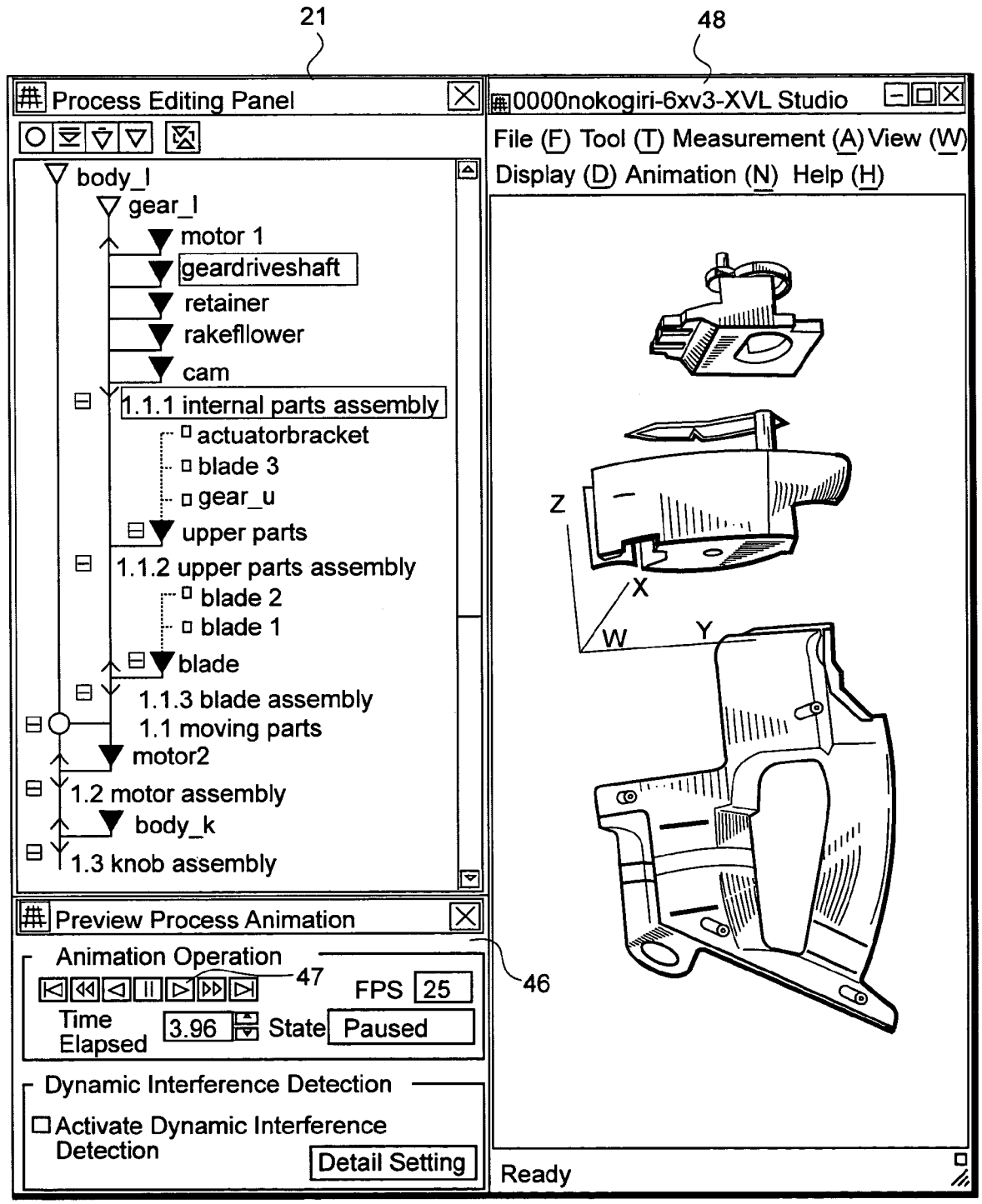
FIG. 30 is a screen display example describing a process modification process.

In order to verify the automatically generated animation, for example, a "Process preview mode" may be selected from the menu (not shown). If [Animation]→[Process preview mode] is selected, the automatically generated animation may be previewed on a graphic screen, as shown in FIG. 30.

If a ">" button 47 is pressed in a "Process animation preview" dialog 46, the animation is replayed in a preview panel 48. Here, the process editing panel 21, the "Process animation preview" dialog 46 and the preview panel 48 work in conjunction with each other, and if a process is selected in the process editing panel 21, an animation start position for that process is selected in response. In addition, when the animation proceeds and switches to another process or group, the new process or group is being selcted in the process editing panel 21.

Now editing and re-generation of the process animation will be described below.

When previewing the automatically generated process animation, there may be found unnatural sections with an interference among assembly procedures, and/or sections requiring some changes in animation.

Figure 31A:
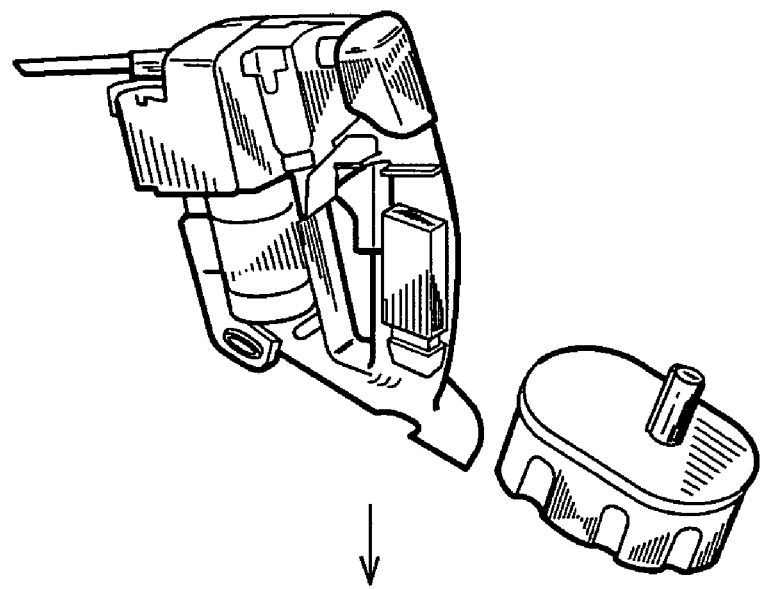
FIGS. 31A and 31B are diagrams showing a parts interference state.
Figure 31B:
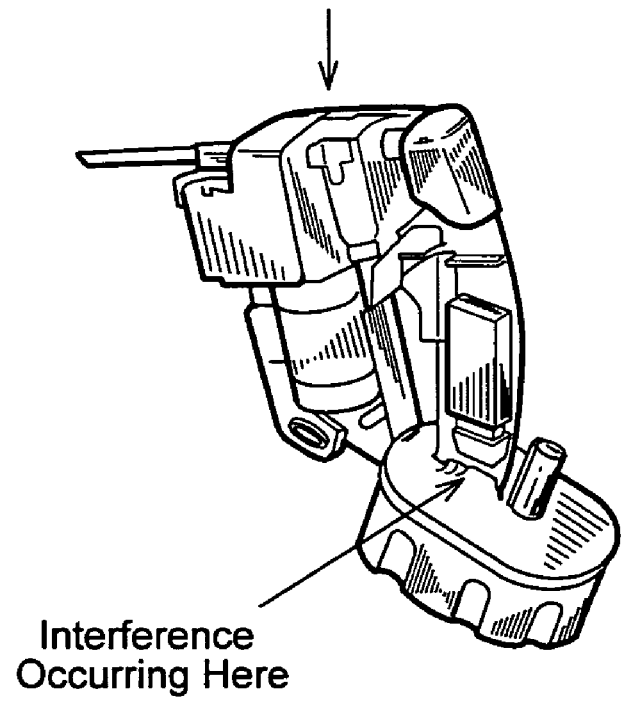

For example, in an animation generated for a "power source assembly", as shown in FIGS. 31A and 31B, an interference is occurring between parts during the assembly. In order to eliminate this interference, the process editing panel 21 is used in conjunction with an animation panel 49 to modify the animation.

Figure 32:
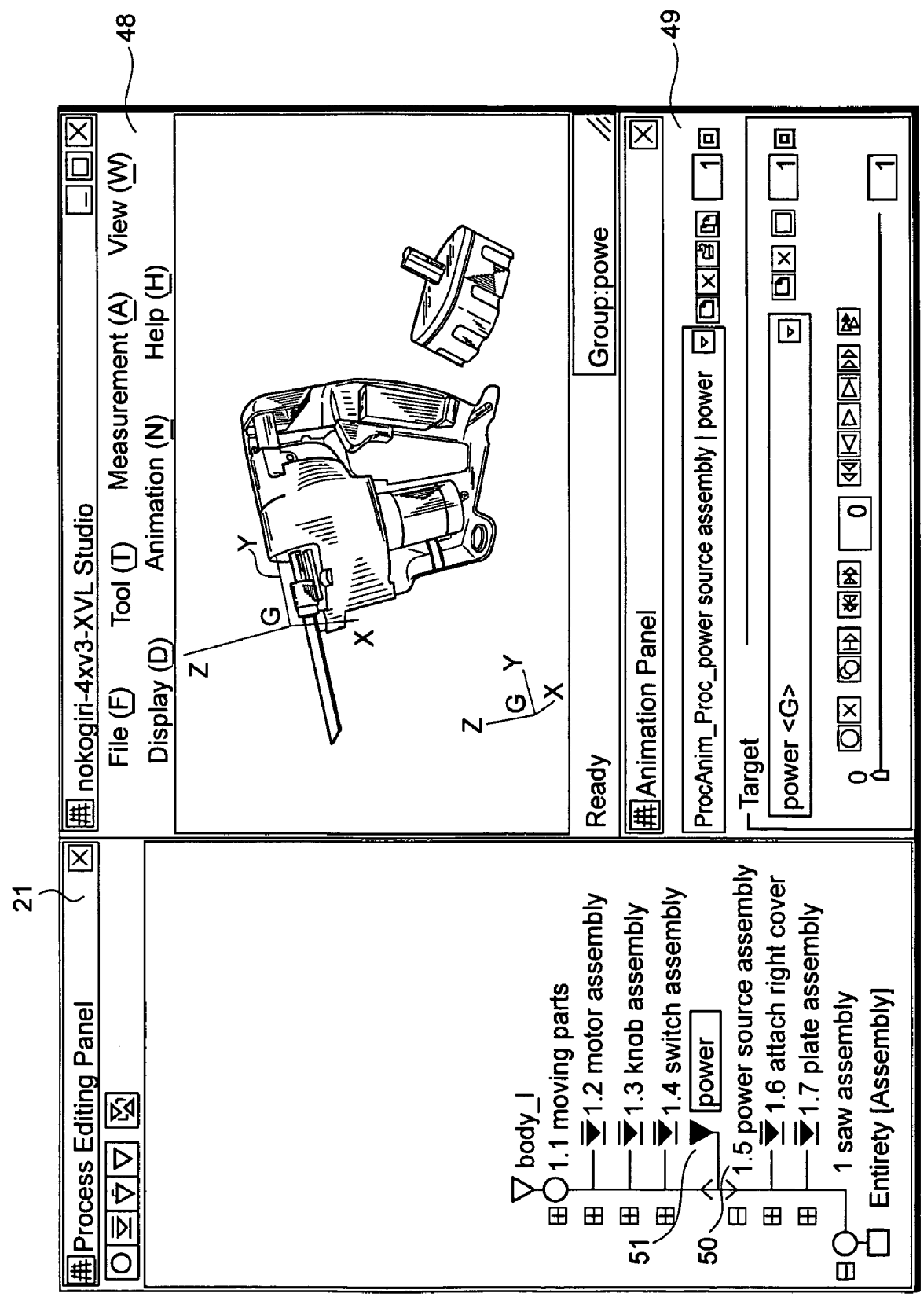
FIG. 32 is a diagram showing one example of an animation editing system.
Figure 33:
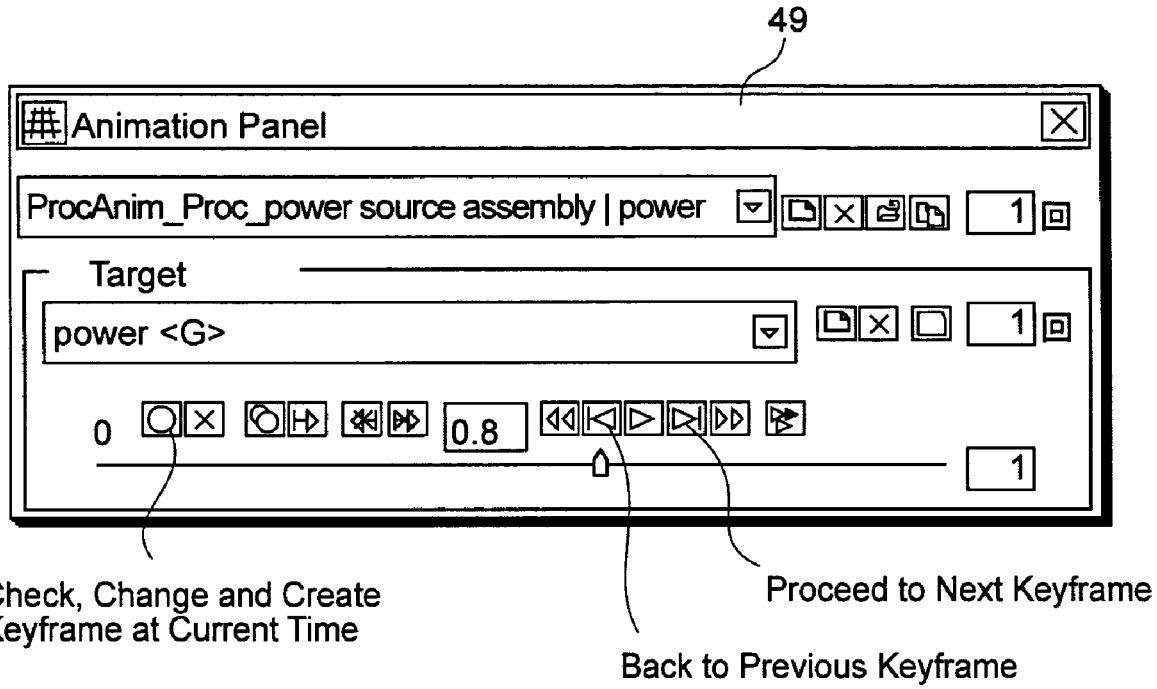
FIG. 33 is a diagram showing one example of an animation editing system using an animation panel.

To do this, "power" 51 above "1.5 power source assembly" 50 in the process editing panel 21 should be selected while the process editing panel 21 and the animation panel 49 are both open, as shown in FIG. 32. By the above selection, an animation corresponding to a motion for the power source assembly is selected in the animation panel 49, as shown in FIG. 32. In the animation panel 49, the animation generated for the "power source assembly" can be checked. This animation panel 49 is displayed as shown in FIG. 33, allowing the user to jump through keyframes with ">|" and "|<" and verify keyframe contents with "○". Here, the following is assumed:

An automatically determined position (0, 160.704, 0) is set at 0 second.

An assembly position is set at the 1 second.

Figure 34:
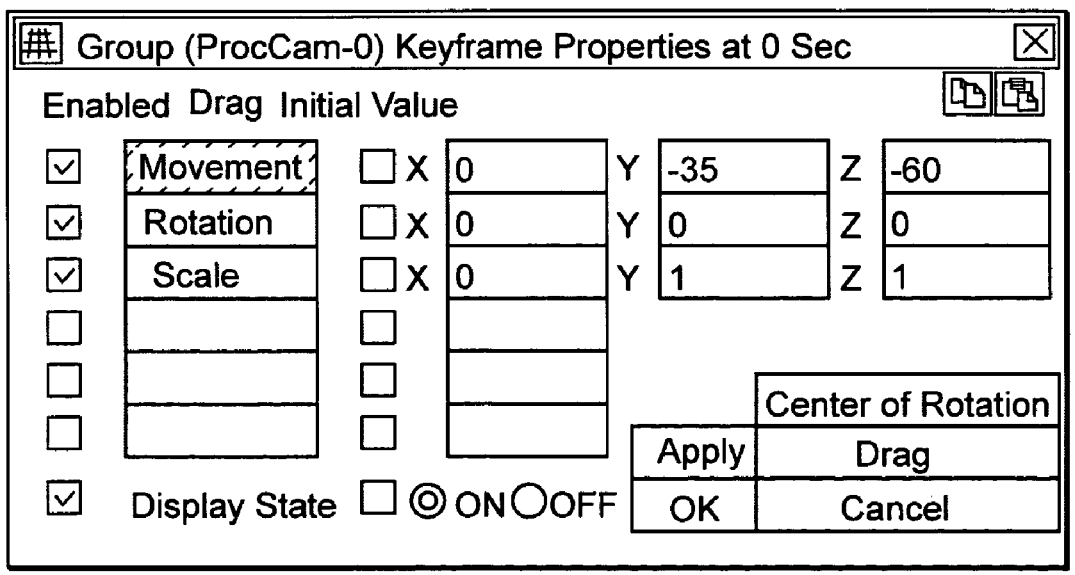
FIG. 34 is a diagram showing one example of an animation editing system using a keyframe property panel.

Here, the problem may be solved by properly modifying the 0-second position. Hence the "○" is pressed at 0 second to edit the keyframe. When the position is set to (0, −35, −60) in a properties dialog of FIG. 34, the objects appear at reasonable positions. The OK button is pressed to change the keyframe. After this change, a ">" button in the animation panel 49 is pressed to replay and verify the animation.

In a similar manner, motions of other parts will be sequentially edited.

Figure 35:
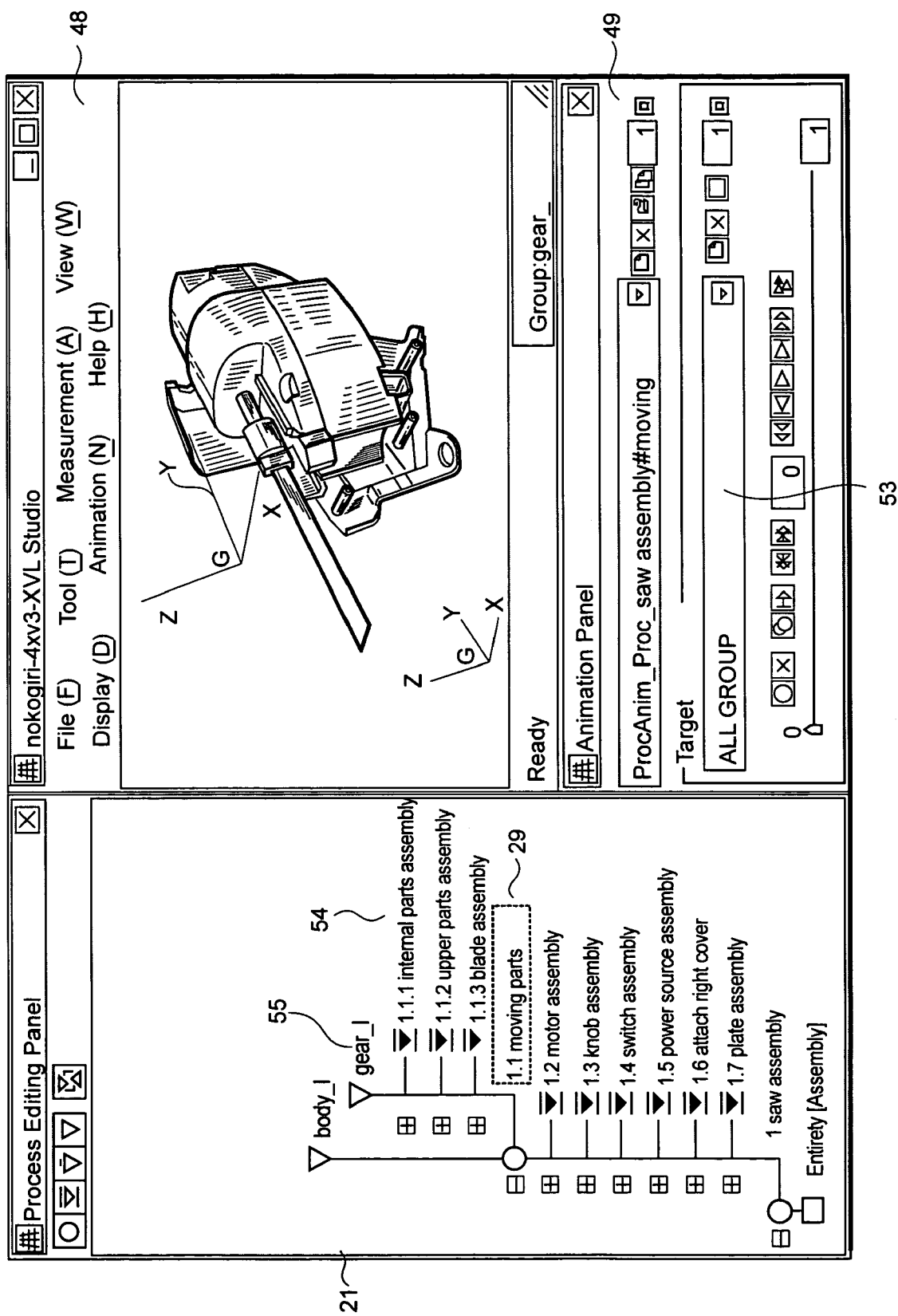
FIG. 35 is a diagram showing one example of an animation editing system.

After the "1.1 moving parts" assembly is completed, a motion to fit this "1.1 moving parts" to the "body_1" is made slightly more complicated. In order to edit the assembly motion of the entire "1.1 moving parts" to the "body_1", select the "1.1 moving parts" 29 in the process editing panel 21, as shown in FIG. 35. Then select "ALL GROUP" from Target 53 in the animation panel 49. Now the motions of all the parts included in the "1.1 moving parts" 29 become editable.

For example, if an initial position (at 0 second) of the "1.1 moving parts" 29 is edited with the "ALL GROUP", the disassembly animation modification unit 15 also modifies in response an assembly animation of the "1.1.1 internal parts assembly" 54, which is an assembly process under the "1.1 moving parts" 29, based on the disassembly definition information 11 or the disassembly algorithm 9.

In the following, view point editing will be described.

Figure 36:
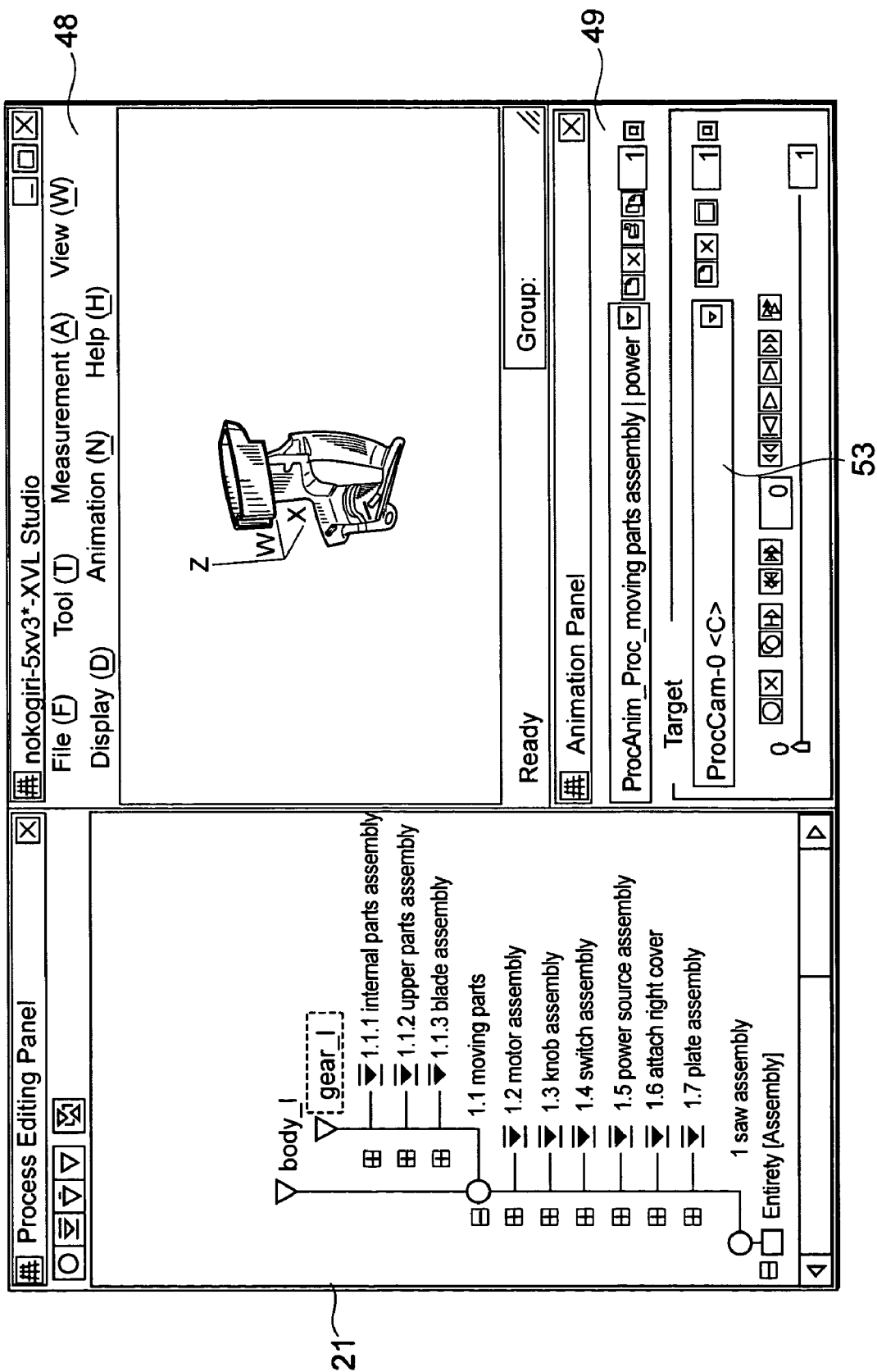
FIG. 36 is a diagram showing one example of a view point editing system.
Figure 37:
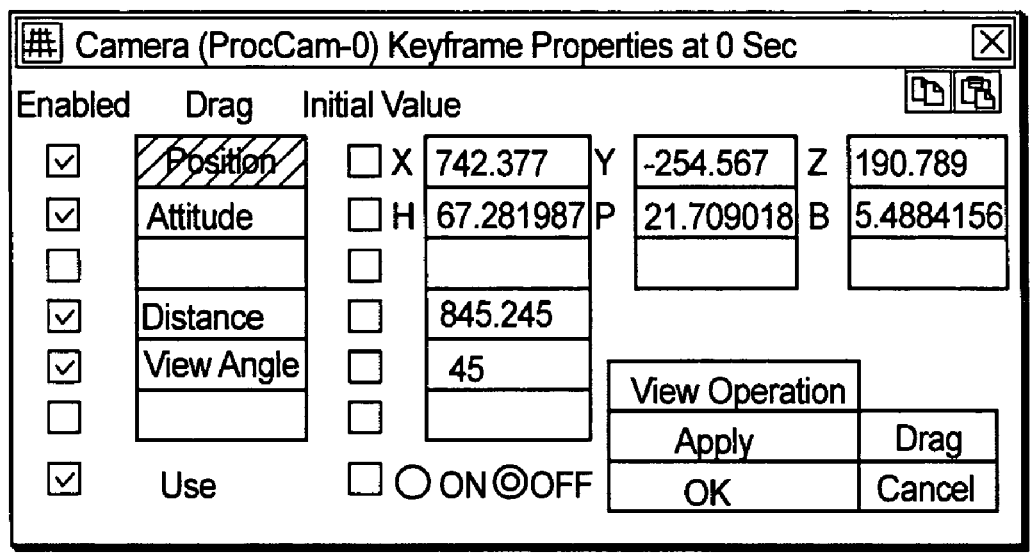
FIG. 37 is a diagram showing one example of a view point editing system.

Since the "1.1 moving parts" 29 is assembled at some distance from other parts in the above processes, the camera view point is edited to move to an appropriate position in an assembly animation of the "1.1 moving parts" 29. In this case, "gear_1" 55 of the "1.1 moving parts" 29 is selected in the process editing panel 21. Then, as shown in FIG. 33, from a pull-down menu of the Target 53 in the animation panel 49, "ProcCam-1" is selected to be added to the animation using a button. After pressing the button, the "gear_1" moves to the 0-second position. The button is pressed at 0 second to edit the view point in the animation panel 49 of FIG. 36. When a dialog shown in FIG. 37 appears, the following should be performed.

1. Press a "View operation" button.

2. Adjust a view point position on the graphic screen. For example, view point rotation is performed by "dragging while pressing down the X key", panning is performed by "dragging while pressing down the Z key", zooming is performed by "dragging while pressing down the C key".

3. Select "ON" for a "Use" radio button.

Figure 38:
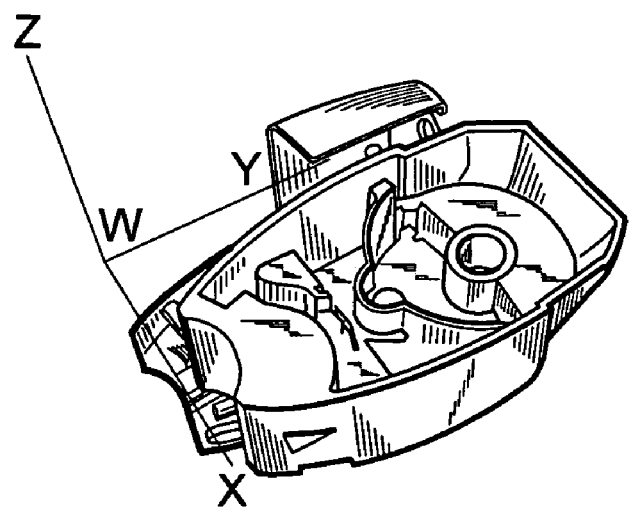
FIG. 38 is a diagram showing one example of a view point editing system.

4. When an appropriate view point is set, as shown in FIG. 38, press the OK button to finish editing.

Edit the camera keyframe in a similar manner for the "motor 2" of the "1.2 motor assembly" as well so that the view point comes to an appropriate position in the processes following the "1.1 moving parts" assembly; e.g., "1.2 motor assembly".

After editing of individual animations is completed, these animations need to be regenerated for the overall flow consistency. The "Create process animation" dialog box 42 of FIG. 28 should be displayed to create animations, and during this operation, note that a "Reuse button" 57 is selected. When this button is checked off, animations edited above are used to re-generate the process animation.

After the completion of the process animation re-generation, the preview operation is performed again to check the results. It should be verified that the animations flow naturally this time.

The disassembly illustrations are created also using the modified disassembly algorithm. Then disassembly illustrations are generated, wherein minimum disassembly units of these disassembly illustrations are parts or parts groups constituting the intermediate process.

Conventionally all animations needed to be manually configured by the user after the designing process. However, according to the structure described above, the task to create animations for indicating the operation procedures may be significantly lightened by utilizing the automatic generation function of the process animation.

It should be mentioned that the present invention is not limited by the above one embodiment, and that various changes and modifications can be made, without departing from the scope and spirit of the present invention.

What is claimed is:

1. A method for generating a parts catalog of a product from three dimensional data and a parts list of the product, wherein the parts catalog comprises the parts list listing at least a name of a part and a reference numeral/symbol of the part, and a disassembled illustration of the product wherein the part in the part list is illustrated in a disassembled state with its reference numeral/symbol; said three dimensional data comprising assembly structure information of the product; and the parts list being a list of parts or partially assembled parts of the product and wherein a user creates said parts list;

the method comprising the steps of
(a) assigning reference numeral/symbols to said parts and partially assembled parts in the parts list;
(b) building a disassembly algorithm based on said parts list; and
(c) generating disassembly illustrations from said three dimensional data based on said disassembly algorithm, wherein maximal disassembled states in the disassembly illustrations are the parts and partially assembled parts assigned with said reference numeral/symbols, and displaying said reference numeral/symbol for each of the parts and partially assembled parts in the disassembly illustrations;
wherein the parts list includes disassembly definition information comprising a tree structure consisting of a node and leave said node being a process and said leave being a part or a partially assembled part, wherein said node comprises a basic process and optionally an intermediate process performed in said basic process, and wherein a partially assembled part consists of parts to be disassembled or assembled in the intermediate process.

2. The method of claim 1, wherein said step (b) generates the disassembly algorithm by adding to the parts list, movement coordinate systems of said basic process and said intermediate processes, and movement positions of the parts or the partially assembled parts-within said movement coordinate systems, based on the disassembly definition information of said parts list.

3. The method of claim 2, wherein in said step (b), for the purpose of generating the disassembly algorithm a shape of each of the parts is approximated with a circumscribing polygon thereof, and said movement position is set such that each polygon is at a minimum distance from each other which is greater than a predetermined ratio.

4. The method of claim 1, further comprising the step of (d) modifying the disassembly algorithm and illustrations after generating the disassembly illustrations.

5. The method of claim 4, wherein said step (d) modifies each of the disassembly illustrations by modifying a position, a bearing or a scale of each of the parts or partially assembled parts.

6. The method of claim 5, wherein said step (d) generates and presents a user interface for modifying the position, bearing or scale for each of the parts or partially assembled parts.

7. The method of claim 5, wherein said step (d) permits modification of a camera view point information to modify the disassembly illustration.

8. The method of claim 5, wherein said step (d) modifies the disassembly illustration by determining an interference among the parts or partially assembled parts during a movement thereof, and by modifying the position, bearing or scale for each of the parts in the processes.

9. The method of claim 8, wherein said interference among the parts or partially assembled parts during the movement thereof is determined by calculating an interference among respective polygons, each of which circumscribes around each of the parts or partially assembled parts.

10. The method of claim 1, wherein
said step (c) comprises the step of drawing a lead line from each of parts and partially assembled parts within the disassembly illustration in order to display said reference numeral/symbol, wherein
said step of drawing a lead line projects a movement vector from a pre-disassembly position to a post-disassembly position for said parts and partially assembled parts, onto a plane perpendicular to a view point vector from a view point, and draws said lead line for said reference numeral/symbol from a post-movement object along an axis direction of a shorter component of analyzed vector components constituting such a projected vector.

11. A computer software program for generating a parts catalog of a product from three dimensional data and a parts list of the product, in a computer system: the parts catalog comprising the parts list listing at least a name of a part and a reference numeral/symbol of the part, and a disassembled illustration of the product wherein the part in the part list is illustrated in a disassembled state with its reference numeral/symbol; said three dimensional data including assembly structure information of the product; and the parts list being a list of parts or partially assembled parts of the product and wherein a user defines said parts list; comprising:

a storage medium;
an instruction means stored in said storage medium for instructing said computer system to assign a reference numeral/symbol based on the parts list, to each of partially assembled parts belonging to an basic process of disassembly, and to each of partially assembled parts belonging to an intermediate process of disassembly, respectively;

an instruction means stored in said storage medium for instructing said computer system to build a disassembly algorithm based on the parts list; and an instruction means stored in said storage medium for instructing said computer system to generate disassembly illustrations from said three dimensional data based on said disassembly algorithm, wherein maximal disassembled states in the disassembly illustrations are the parts and partially assembled parts assigned with said reference numeral/symbols, and to display said reference numeral/symbol for each of the parts and partially assembled parts in the disassembly illustrations, wherein the parts list includes disassembly definition information comprising a tree structure consisting of a node and leave, said node being a process and said leave being a part or partially assembled part, wherein said node comprises a basic process.

* * * * *

UNITED STATES PATENT AND TRADEMARK OFFICE
CERTIFICATE OF CORRECTION

PATENT NO. : 7,567,850 B2
APPLICATION NO. : 10/530219
DATED : July 28, 2009
INVENTOR(S) : Tomohiro Yamada et al.

It is certified that error appears in the above-identified patent and that said Letters Patent is hereby corrected as shown below:

<u>Title Page</u>,
Item (73) Assignee:

After "Toyota Jidosha Kabushiki Kaisha, Aichi-Ken (JP)" insert:
-- Lattice Technology, Inc., Chiyoda-Ku (JP) --.

Signed and Sealed this

Twenty-ninth Day of December, 2009

David J. Kappos
*Director of the United States Patent and Trademark Office*